US008614969B2

(12) United States Patent
Youn et al.

(10) Patent No.: US 8,614,969 B2
(45) Date of Patent: Dec. 24, 2013

(54) METHOD FOR COGNITIVE RADIO BASED COMMUNICATION AND METHOD FOR BROADCASTING POLICY INFORMATION FOR THE SAME

(75) Inventors: Ae Ran Youn, Anyang-si (KR); Yong Ho Kim, Anyang-si (KR); Yeong Hyeon Kwon, Anyang-si (KR); Hyun Soo Ko, Anyang-si (KR); Jin Hyuk Jung, Anyang-si (KR); Moon Il Lee, Anyang-si (KR); Wook Bong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 763 days.

(21) Appl. No.: 12/441,350

(22) PCT Filed: Sep. 14, 2007

(86) PCT No.: PCT/KR2007/004454
§ 371 (c)(1),
(2), (4) Date: Dec. 22, 2009

(87) PCT Pub. No.: WO2008/032999
PCT Pub. Date: Mar. 20, 2008

(65) Prior Publication Data
US 2010/0091701 A1    Apr. 15, 2010

(30) Foreign Application Priority Data

Sep. 15, 2006   (KR) .................. 10-2006-0089478
Sep. 18, 2006   (KR) .................. 10-2006-0090273

(51) Int. Cl.
*H04J 1/00*      (2006.01)
(52) U.S. Cl.
USPC ........... 370/281; 370/335; 370/390; 370/432; 370/441

(58) Field of Classification Search
None
See application file for complete search history.

(56) References Cited

U.S. PATENT DOCUMENTS

| 2002/0155844 A1 | 10/2002 | Rankin et al. |
| 2004/0047324 A1 | 3/2004 | Diener |

(Continued)

FOREIGN PATENT DOCUMENTS

| CN | 1663156 A | 8/2005 |
| CN | 1829385 A | 9/2006 |

(Continued)

OTHER PUBLICATIONS

Muck et al., "Evolution of Wireless Communication Systems Towards Autonomously Managed, Cognitive Radio Functionalities", IEEE Operations Center, Piscataway, NJ, Sep. 1, 2006, pp. 1-5, XP031051230.

(Continued)

*Primary Examiner* — Faruk Hamza
*Assistant Examiner* — Tito Pham
(74) *Attorney, Agent, or Firm* — Birch, Stewart, Kolasch & Birch, LLP

(57) ABSTRACT

A method of broadcasting frequency policy information in a cognitive radio based communication system, apparatus therefore and a communication method using the same are disclosed. In particular, a policy broadcaster is provided as a subject performing a broadcast of frequency policy information in cognitive radio communication. A method of broadcasting frequency policy information using the same and a method of performing cognitive radio communication by obtaining frequency policy information using the same are provided. Moreover, an enhanced superframe structure, which is capable of providing a seamless service in case that a narrowband terminal is introduced in the middle of a superframe, is provided.

14 Claims, 9 Drawing Sheets

(56) References Cited

U.S. PATENT DOCUMENTS

| | | |
|---|---|---|
| 2005/0170839 A1* | 8/2005 | Rinne et al. .......... 455/446 |
| 2006/0018279 A1 | 1/2006 | Agrawal et al. |
| 2007/0060145 A1* | 3/2007 | Song et al. .......... 455/445 |
| 2007/0117517 A1 | 5/2007 | Hui et al. |
| 2007/0213046 A1 | 9/2007 | Li et al. |
| 2008/0051099 A1* | 2/2008 | Moore et al. .......... 455/454 |
| 2010/0238868 A1* | 9/2010 | Melpignano et al. ......... 370/329 |

FOREIGN PATENT DOCUMENTS

| | | |
|---|---|---|
| CN | 1832613 A | 9/2006 |
| EP | 1 750 466 A1 | 2/2007 |
| JP | 10-208732 A | 8/1998 |
| KR | 10-2003-0011909 A | 2/2003 |
| KR | 10-2005-0033326 A | 4/2005 |
| WO | WO 03/090037 A2 | 10/2003 |
| WO | WO 2005/122425 A2 | 12/2005 |
| WO | WO 2007/055551 A1 | 5/2007 |

OTHER PUBLICATIONS

Nekovee, "Dynamic spectrum access-concepts and future architectures", BT Technology Journal, vol. 24, No. 2, Kluwer Academic Publishers, Apr. 2006, pp. 111-116, XP019392404.

Bellec et al., "A PHY/MAC Proposal for IEEE 802.22 WRAN Systems", IEEE P802.22 Wireless RANs, doc.: IEEE 802.22-06/0005rl, Jan. 17, 2006, 222 pages provided.

Birru et al., "A Cognitive PHY/MAC Proposal for IEEE 802.22 WRAN Systems Part 1: The Cognitive PHY", IEEE P802.22 Wireless RANS, doc.: IEEE 802.22-05/0103r0, Nov. 7, 2005, 33 pages provided.

* cited by examiner

METHOD FOR COGNITIVE RADIO BASED COMMUNICATION AND METHOD FOR BROADCASTING POLICY INFORMATION FOR THE SAME

TECHNICAL FIELD

The present invention relates to a wireless communication system, and more particularly, to a method of broadcasting frequency policy information in a cognitive radio based communication system, an apparatus therefore, and a communication system using the same.

BACKGROUND ART

Recently, it is expected that the demands for frequencies will rise to keep up with the ubiquitous age. So, the frequencies are regarded as resources having vast economic values and many efforts in a national strategic dimension are being made to the frequency managements by the governments of U.S.A., Great Britain, Japan, and the like. In particular, developments for spectrum managing tools, establishment of extended-term spectrum using plans, promotions in market-directional frequency collection and reassignment policy, unlicensed band extension, and introduction of market-voluntary open frequency policy in command & control are accelerated. And, many countries make aggressive efforts to research and develop the technologies for minimizing interferences with conventional frequencies and the frequency sharing technologies considering locality.

As the wireless communication broadcasting industry has been recently developed, the demands for the frequencies as bases of the corresponding services have risen rapidly. And, the frequency values are rapidly raised.

Since the demand for frequencies was not so high relatively in the past days, a frequency supply to a new service was no big deal. As the demands for frequencies rise explosively nowadays, it is very difficult to supply frequencies to the right places at the right times.

Moreover, there exist preferred bands having excellent radio wave characteristics and the demands for the bands are very high. So, providers often get involved in troubles for the preferred frequency bands.

Hence, frequencies have very high economic values and can be regarded rare resources of limited supplies. And, many efforts are made to research and develop such a new frequency sharing technology as UWB (ultra wide band), CR (cognitive radio), and the like to technically settle the frequency shortage.

The present invention is directed to a problem based on cognitive radio (hereinafter abbreviated CR) as one of the aforesaid radio transmission schemes to use frequencies efficiently in the future. And, the related art communication system and the CR based communication system are schematically explained as follows.

First of all, data transmission and reception are normally implemented by currently serviced radio communication services using fixed bandwidths. In particular, a mobile communication system obtains maximum performance through inter-cell frequency assignment using a resource allocated to a specific band. A scheme of transmitting/receiving a signal using a fixed band has a fixed frame for its implementation. In order to support a higher quality of service (e.g., increasing throughput, increasing a number of users to provide a service, etc.) by fitting a currently used system specifications, a cell structure is normally segmented into small pieces or a new infrastructure is established by expanding old system specifications to keep up with the demand.

In using a frequency resource so far, there are a service system using a fixed bandwidth and a recent service system using a scalable bandwidth that selectively applies one of various bandwidth options.

In determining a standard of a service, the service system using the fixed bandwidth performs a service by forming a standardized frame in a manner of applying various proper transmitting/receiving schemes to the corresponding band. And, a burden of modifying a whole service system in accordance with every variation of the standard is imposed on the service system using the fixed bandwidth.

On the contrary, the standard utilizing the scalable bandwidth is designed to facilitate controls of a variation of a bandwidth and a quality of service rather than the case of the fixed bandwidth. Yet, the scalable bandwidth service operates in a same manner of the fixed bandwidth service in an actual service operation situation. Namely, the scheme for changing a quality of service without increasing complexity of hardware uses the same scheme instead of changing the technique of broadening or narrowing a bandwidth to obtain a result from using the scalable bandwidth.

As mentioned in the foregoing description, as the demand for radio communication services rapidly increases and various techniques appear, a demand for frequencies exceeds a supply. So, there is a problem that there barely exists a band margin available for several GHz bands, in particular, a low frequency band having good frequency characteristics. To solve this problem, CR scheme appears. The CR scheme is proposed by Mitola in 1999 for the purpose of using a frequency band more efficiently. By the CR scheme, a vacant frequency, which is not actually in use, is detected and then shared and used efficiently.

In particular, CR is basically implemented based on software defined radio (SDR). The CR is able to judge and decide whether to set an unused spectrum to a basic communication band by searching spectrum, whether to change a service type by modifying SDR architecture in accordance with a searched service type, or whether to change a quality of service. Considering the basic concepts and the currently active various radio services, it is decided that personally carried wireless terminals converge into one type and it is also expected that a CR terminal will be suitable for the corresponding convergence.

Thus, communication systems according to the currently discussed frequency managing schemes can be categorized into 1) Fixed Bandwidth Communication System, 2) Scalable Bandwidth Communication System, and 3) CR Based Communication System. Ad, their operational systems are schematically explained with reference to the drawings as follows.

FIG. 1 is a diagram to explain a fixed bandwidth service system.

Referring to FIG. 1, a fixed bandwidth service system provides a service using a bandwidth set in an initial standardizing step like a current mobile communication system (CDMA or GSM), a wireless LAN (802.11 or HiperLAN), or a wireless PAN (802.15).

A frequency use approval for the service bandwidth is granted by a government or a predetermined quantity of the service bandwidth is used for a frequency band known in public.

This service, as shown in FIG. 1, is characterized in that there is no increase or decrease of a frequency bandwidth in accordance with time at all and in that a service within a preset bandwidth is optimized within the bandwidth. Hence, FIG. 1 shows that a preset bandwidth keeps being used regardless of a quantity of current traffics.

FIG. 2 and FIG. 3 are diagrams to explain a scalable bandwidth service system.

Scalable bandwidth service systems can be categorized in two types shown in FIG. 2 and FIG. 3, respectively. The two types include a type that a bandwidth used by a terminal is scalable in a state that a service band of a base station is fixed and a type that a bandwidth used by a base station is scalable as well.

First of all, an example that a bandwidth used by a base station is fixed and that a bandwidth serviced for a terminal in the bandwidth of the base station is scalable is shown in FIG. 2. The example of the service includes such a service using OFDM as 902.16, 802.20, and 3GPP LTE or such a CDMA service of assigning a bundle of channels to a terminal as EV-DO and EV-EV. In theses services, a corresponding service is accessed in a manner that a total bandwidth used by a base station is set and that a specific bandwidth is assigned to a bandwidth used by a terminal by a corresponding base station. In this case, a bandwidth to be used by a base station is set in advance in case of system installation.

On the contrary, a case that a bandwidth serviced by a base station varies in accordance with time, as shown in FIG. 3, is possible. This case corresponds to a service model generated when CR is accommodated by 802.22. In particular, an available spectrum per time is detected and a base station extends its service within an available bandwidth. In this case, requirements for a terminal include that the corresponding bandwidth should be entirely accommodated. FIG. 3 exemplarily shows variations of a frequency bandwidth used by a base station and a terminal in accordance with time.

FIG. 4 is a diagram to explain a CR based service system.

Basically, CR does not specify a specific scheme. And, CR means that a configuration of a terminal varies in accordance with a spectrum resource to use a current spectrum resource more efficiently.

FIG. 4 shows how a CR terminal makes an access if there is an unused portion in a spectrum. When there is a spectrum band to be observed, if an unused area is found from the corresponding band, a communication service to be implemented with CR within the area is provided. The communication service can include a fixed band service or a scalable band service. And, the communication service differs from a conventional service in that, since a spectrum varies in accordance with time, a protocol for managing the spectrum variation and a learning process are needed. Moreover, a current standard for implementing CR is 802.22 WRAN system.

Based on the above explanation, the CR can be defined as a technique for transmitting/receiving a radio signal without interference with another device in a manner of cognizing a surrounding radio environment and deciding a communication parameter optimal for a radio environment by itself.

In most countries, personal short-range radio devices use unlicensed frequency bands in general. Yet, a frequency band available without license is limited and the rest of frequency bands are almost assigned to other usages. So, it is difficult to secure a frequency band for a new service. Yet, in the present status of actual frequency use, a situation is a little different. Many frequency bands over 2 GHz are not actually in use and there exist frequency bands not used temporally or spatially in major frequency bands below 1 GHz for TV or mobile communications.

FCC (federal communications commission) performs a study for a real frequency use rate to survey an average frequency use rate varying temporarily or locally. And, the survey says that there is about 15~85% of a use rate. FCC announces NPRM (notice of proposed rulemaking) to raise frequency use efficiency in December, 2003 to notice redundant use availability for vacant frequencies. Upon this opportunity, the frequency shortage problem can be considerably mitigated.

Since the frequency sharing use availability by CR technique was announced by FCC NPRM in December, 2003, many efforts have been made to develop a real system by a first meeting for IEEE802.22 in November, 2004. This organization discusses standardization for CR applied WRAN on a TV band shown in FIG. 5.

FIG. 5 shows a diagram to explain a CR sharing concept for TV frequency band.

Referring to FIG. 5, IEEE 802.22 provides WRAN service by sharing a TV band. And, a service unit is determined as an integral multiple of an available TV channel (6 MHz TV channel in FIG. 5).

In particular, if there is an unused TV channel, which is indicated as 'unused TV channel' in FIG. 5, cognized by a base station, this channel is used for WRAN service. And, if TV channels are consecutively available within a range proposed by a standardization, these channels are combined together to use as a single band. And, a service using the whole is provided. FIG. 5 shows a case that multi-carriers are transmitted to correspond to an unused TV channel environment for example.

And, a terminal cognizes the whole channel status of the base station and should extend its reception capability as well.

Meanwhile, a conventional frequency policy differs per a country or a region in frequency band and frequency assignment specifications for a mobile communication, a wireless LAN and the like. So, in order for a CR terminal to operate correctly, information on a local frequency policy should be retained. Based on this information, when the CR terminal accesses a frequency band in the future, a communication service selection and an operation of a communication system is governed.

However, a method for obtaining information on a frequency policy in a random area is not defined in the conventional frequency policy and the conventional communication method. So, when a power of a CR based terminal is turned on in a random area or a CR based terminal moves away into a random area, the CR based terminal fails to cognize a frequency policy corresponding to the area but is unable to be converted to a communication system suitable for a frequency of the corresponding area.

Moreover, if an open frequency policy depending on a self-regulating market is adopted to proceed instead of adopting a conventional command & control type frequency policy uniformly, the absence of the per area frequency policy information obtaining scheme may cause a considerable problem.

DISCLOSURE OF THE INVENTION

Technical Objects

Accordingly, the present invention is directed to a cognitive radio based communication system, an apparatus therefore, and a communication system using the same that substantially obviate one or more of the problems due to limitations and disadvantages of the related art.

An object of the present invention is to provide a frequency policy information broadcasting method, in which a subject for broadcasting a policy broadcasting packet is provided to enable a terminal to obtain information on a frequency policy of a corresponding area from a random area.

Another object of the present invention is to efficiently implement CR communication of high quality by providing a format of the policy broadcasting packet and contents of information included in the format to enable a terminal to smoothly perform the CR communication in a random area.

Another object of the present invention is to provide a communication method of a terminal to enable the terminal to smoothly perform CR communication using frequency policy information broadcasting, by which a method of enabling a terminal to cognize an available frequency band for CR communication in a specific service system is provided to enable CR communication of a frequency-efficient and user-specific service system to be implemented.

Another object of the present invention is to disclose a problem of a conventional superframe structure and to provide an enhanced super fame structure and a communication method using the same.

Additional features and advantages of the invention will be set forth in the description which follows, and in part will be apparent from the description, or may be learned by practice of the invention. The objectives and other advantages of the invention will be realized and attained by the structure particularly pointed out in the appended drawings.

Technical Solution

One embodiment of the present invention proposes a method of broadcasting frequency policy information for cognitive radio (CR).

To achieve these and other advantages and in accordance with the purpose of the present invention, as embodied and broadly described, in broadcasting frequency policy information for radio communication, a frequency policy information broadcasting method according to the present invention includes generating a policy broadcasting packet including per region frequency policy information and broadcasting the generated policy broadcasting packet. The policy broadcasting packet generating step and the policy broadcasting packet broadcasting step may be carried out by a policy broadcaster provided to perform a broadcast of the frequency policy information.

To further achieve these and other advantages and in accordance with the purpose of the present invention, a policy information broadcasting method according to the present invention includes generating a policy broadcasting packet including per region or service power regulation situation information and broadcasting the generated policy broadcasting packet, wherein the policy broadcasting packet generating step and the policy broadcasting packet broadcasting step are preferably carried out by a policy broadcaster provided to perform a broadcast of policy information.

To further achieve these and other advantages and in accordance with the purpose of the present invention, in broadcasting frequency policy information for cognitive radio (CR) communication, a frequency policy information broadcasting apparatus according to the present invention includes a packet generating unit generating a policy broadcasting packet including per region frequency policy information and a broadcasting unit broadcasting the generated policy broadcasting packet, wherein the apparatus is provided to perform a broadcast of the frequency policy information for the cognitive radio communication.

To further achieve these and other advantages and in accordance with the purpose of the present invention, in performing communication by a terminal based on cognitive radio (CR) communication, a cognitive radio based communication method according to the present invention includes receiving a policy broadcasting packet including per region frequency policy information from a policy broadcaster provided to perform a broadcast of the frequency policy information for the cognitive radio communication, obtaining current location information of the terminal, sensing an available frequency band in accordance with a frequency policy corresponding to the obtained location information from the per region frequency policy information, and when the available frequency band is sensed, initiating the communication via the available frequency band.

To further achieve these and other advantages and in accordance with the purpose of the present invention, a cognitive radio communication based terminal, which performs communication based on cognitive radio (CR) communication, according to the present invention includes a packet receiving unit receiving a policy broadcasting packet including per region frequency policy information from a policy broadcaster performing a broadcast of the frequency policy information for the cognitive radio communication, a sensing unit sensing an available frequency band in accordance with a frequency policy corresponding to the location obtained by the location information obtaining unit from the per region frequency policy information, and a transmitting unit, initiating the communication via the available frequency band, when the sensing unit senses the available frequency band.

To further achieve these and other advantages and in accordance with the purpose of the present invention, a communication method, which uses a superframe including at least one resource area supporting narrowband mode communication, according to the present invention comprises obtaining position information of the resource area supporting the narrowband mode communication by searching a header part of a unit resource area and performing data communication with a base station via the resource area corresponding to the obtained position information.

It is to be understood that both the foregoing general description and the following detailed description are exemplary and explanatory and are intended to provide further explanation of the invention as claimed.

Advantageous Effects

According to one embodiment of the present invention, a subject for broadcasting a policy broadcasting packet is provided and a frequency policy information broadcasting method by the subject is provided. If a power of a terminal is turned on or if a terminal moves away into a corresponding area by handoff, the terminal is facilitated to obtain frequency policy information of a region where the terminal is located. And, the terminal is facilitated to sense a service actually usable in the corresponding area and an available frequency band for the service. Hence, the terminal is able to perform CR communication having high frequency efficiency.

And, a communication method of a terminal using the frequency policy information broadcasting is provided. Particularly, a method of enabling a terminal to cognize details of an available frequency band for CR communication is a specific service system is provided. Hence, CR communication of a frequency-efficient and user-specific service system can be implemented.

According to one embodiment of the present invention, a superframe, which includes at least one resource region supporting narrowband mode communication and has a structure that information indicating a location of the resource region is included in a header unit of a unit resource region, is used. If a terminal enters a network within a superframe period, a band is divided to support narrowband mode communication like the related art. Hence, it is able to provide a seamless communication service to a narrowband terminal without interrupting a communication service until a next superframe.

And, by inserting information indicating a location of a resource region for providing a narrowband terminal with a seamless communication service in a superframe, a terminal is able to efficiently obtain location information of a corresponding resource region.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Mode for Invention

Reference will now be made in detail to the preferred embodiments of the present invention, examples of which are illustrated in the accompanying drawings.

The following detailed description disclosed together with the accompanying drawings intends to present not a unique embodiment of the present invention but an exemplary embodiment. The following details include particular details to provide complete understanding of the present invention. Yet, it is apparent to those skilled in the art that the present invention can be implemented without the particular details. For instance, a structure of 'policy broadcasting packet' which will be explained later in the following description, includes not only a structure to achieve the objects of the present invention but also detailed configurations for those skilled in the art to facilitate the implementations. And, other detailed configurations can be replaced by different configurations as long as a structure for obtaining an effect intended by the present invention is included.

In the following description, a target for a base station to communicate with can be represented as a terminology including one of 'terminal', 'user equipment', 'CPE' and the like. Yet, theses terminologies do not put limitation of the present invention. So, an arbitrary subject can correspond to the target without being limited to these terminologies as long as it can perform CR communication of the present invention with a base station.

In some cases, a structure or device known to public is omitted to avoid conceptional vagueness of the present invention or depicted as a block diagram centering on core functions of the structure or the device. And, the same reference numbers are designated to the same elements in this disclosure overall.

The present invention provides a frequency policy broadcasting mechanism to support CR terminals based on cognitive radio (CR) that is one of radio transmission schemes to use frequencies efficiently in the future and also provides a corresponding CR communication method of a terminal.

In the following description, explained are how to provide a CR structure and a frequency policy broadcasting mechanism based on the CR structure and what kind of a system is efficient for a corresponding communication system.

Figure 1:
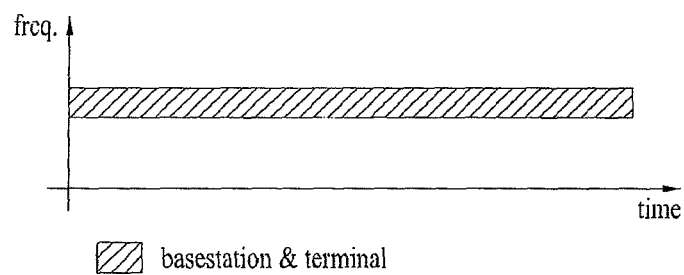
FIG. 1 is a diagram to explain a fixed bandwidth service system.
Figure 2:
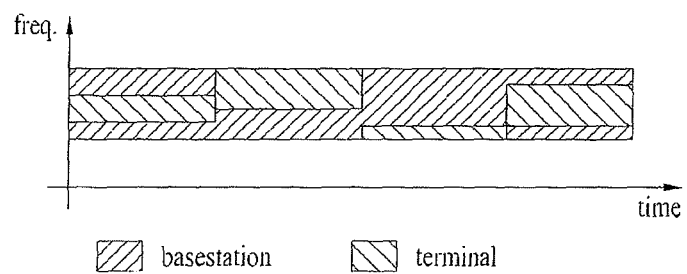
FIG. 2 and FIG. 3 are diagrams to explain a scalable bandwidth service system.
Figure 3:
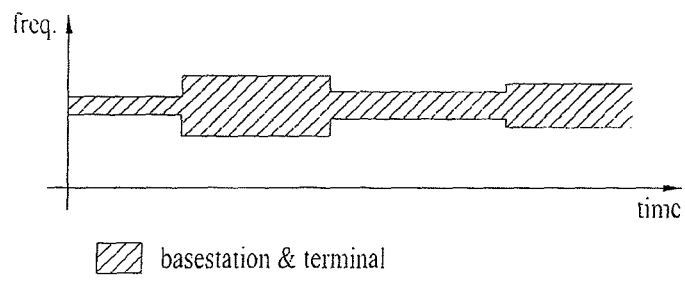
Figure 4:
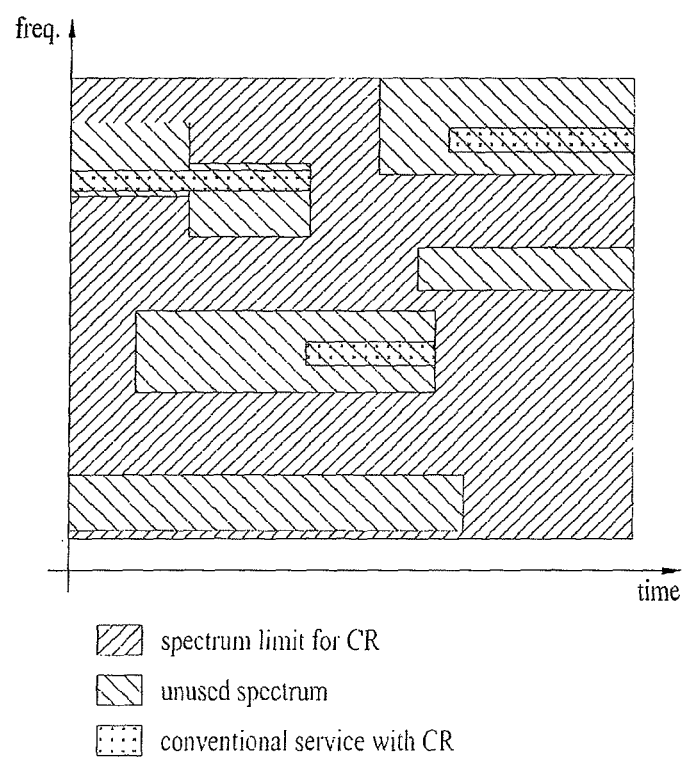
FIG. 4 is a diagram to explain a CR based service system.
Figure 5:
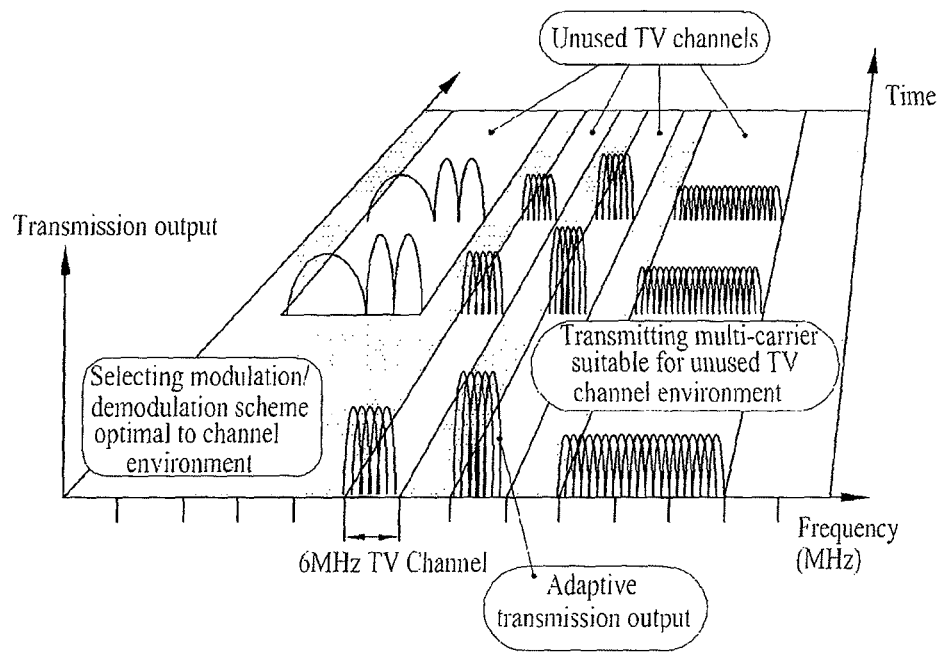
FIG. 5 shows a diagram to explain a CR sharing concept for TV frequency band.
Figure 6:
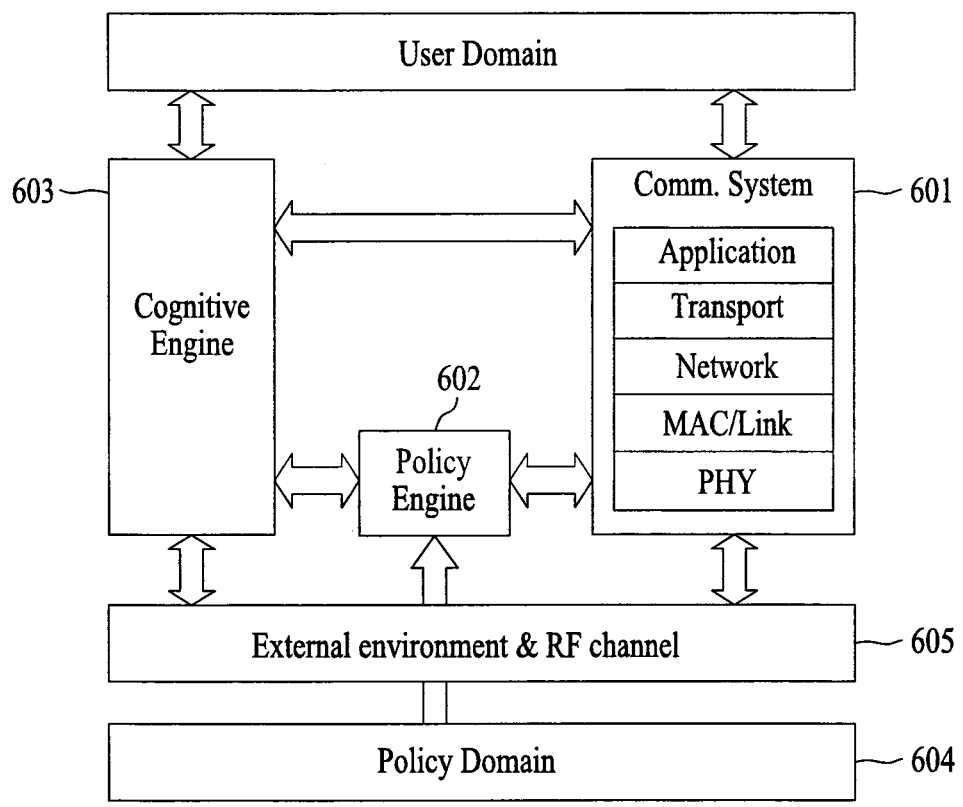
FIG. 6 is a diagram of an overall structure for enabling a CR based terminal/base station to operate.

FIG. 6 is a diagram of an overall structure for enabling a CR based terminal/base station to operate.

Blocks are explained as follows. A structure for a CR terminal/base station to process a communication signal includes a communication system 601 performing actual communication, a policy engine 602 performing management for a frequency policy, and a cognitive engine 603 making an appropriate countermeasure by tracking down a momentary spectrum variation.

Meanwhile, the CR terminal/base station is able to set up an available frequency and an observation frequency band by a frequency policy in accordance with each country or region and to obtain information on what kind of a service is available from a policy domain 604. Based on this information, in accessing a channel in the future, the CR terminal/base station administers a communication service selection and an operation of a communication system.

The cognitive engine 603 decides which service will be performed on a prescribed frequency in accordance with a present use status of a spectrum and information provided by the policy engine 602 and then performs an optimization on a communication system and a control on a communication protocol. In this case, the communication system should be equipped with communication specifications capable of accommodating an external environment and a variation of an RF channel 605, i.e., a variation of spectrum.

In order a CR based terminal to operate, the CR terminal, as shown in FIG. 6, has to receive a frequency policy in accordance with a corresponding country or region from the policy domain 604, is able to set up an available frequency and an observation frequency band in accordance with the received frequency policy, and should obtain information which indicates what kind of service is available.

Yet, a current CR communication method fails to provide a mechanism for a terminal to obtain the per region policy information, which fails to facilitate the terminal to cope with a case that there is a change of policy information, a case that there is a change of a parameter for sensing a variation of an external environment or the RF channel 605 or the like, a case that a location of the terminal is changed, a case that a power of the terminal is initially turned on, and the like.

Meanwhile, a current radio wave use system is coming into effect in aspects of device certification such as radio station license/inspection, radio device formality official approval/registration, and information device electromagnetic wave suitability registration and efficient management of radio wave resources for illegal facility control and the like. Thus, the domestic radio wave use system mostly relates to command & control (over 90%). Now, it is the time to make a flexible turn toward a market to accelerate a new radio wave use market creation and to plan peripheral industry developments ahead. If the radio wave use system makes a transition to the market-directional system, the demand for a means for enabling a terminal to obtain information on a per region frequency policy will rise considerably.

Hence, a frequency policy information broadcasting mechanism according to one embodiment of the present invention is proposed as follows.

Figure 7:
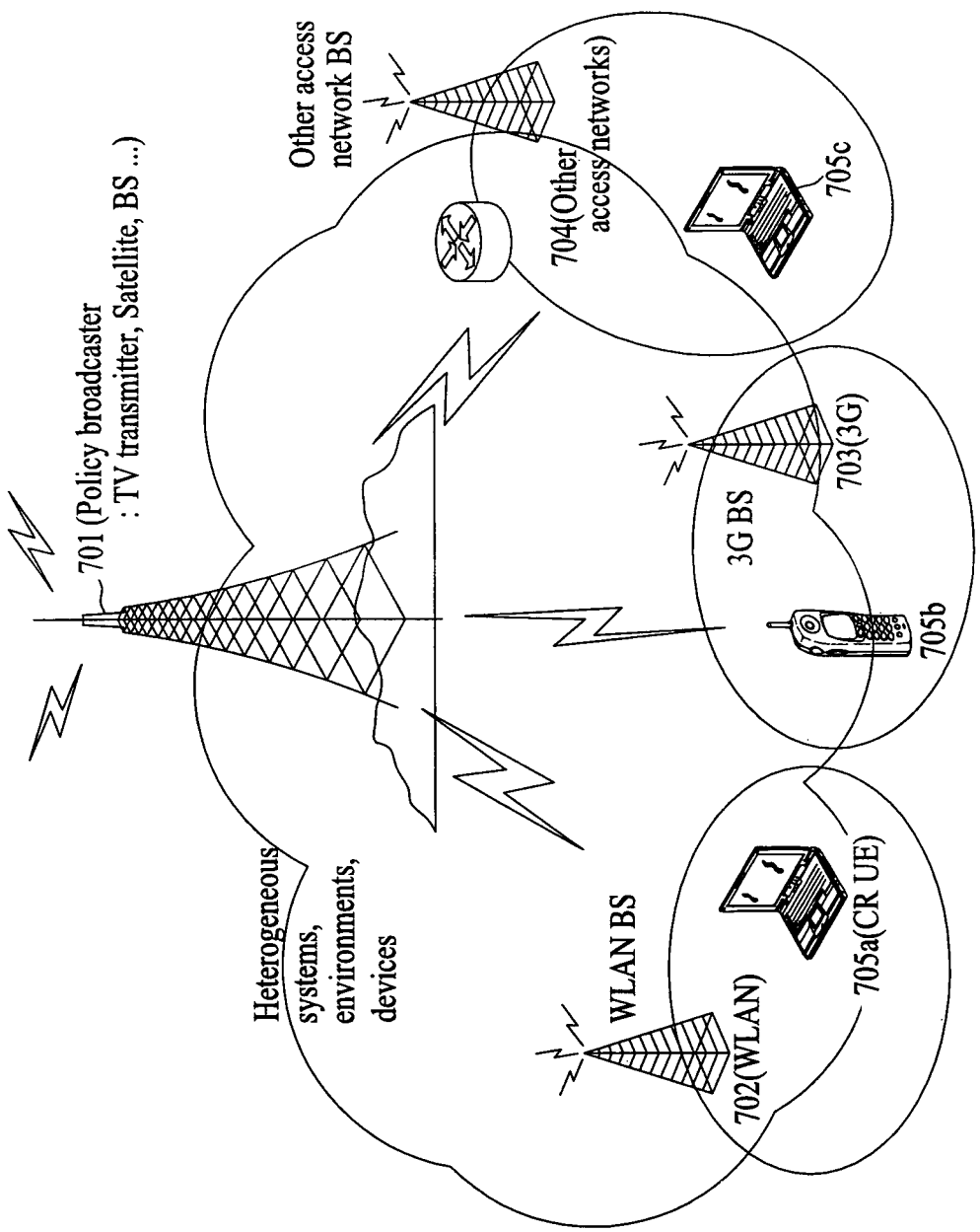
FIG. 7 is a diagram to explain frequency policy information broadcasting mechanism according to one embodiment of the present invention.

FIG. 7 is a diagram to explain frequency policy information broadcasting mechanism according to one embodiment of the present invention.

Referring to FIG. 7, a method for broadcasting a frequency policy corresponding to each region or each country and information for operating CR terminals 705a, 705b, and 705c through a prescribed system is proposed. The prescribed system enables a TV broadcasting station, a satellite, or a prescribed base station to provide a service. If the prescribed system is capable of broadcasting the per region frequency policy information, it is unnecessary to be limited to a specific system. In the following description, this is named 'policy broadcaster 701' or 'policy broadcasting device'.

Information broadcasted by the policy broadcaster 701 is to control settings of the terminals 705a, 705b and 705c, a provided communication service, a frequency regulation, and the like and includes information on frequency assignment specifications per region or country, information on an available service on a corresponding frequency band, and the like.

In this case, the 'available service' means a communication scheme serviced on an available frequency band in a specific region, e.g., a WLAN communication service 702, a 3G communication service 703, and other access network service 704 and can exist in a plurality of communication systems each of which provides a single service (e.g., a case that the WLAN communication service 702 is provided by a system 1 and a system 2 respectively provided by two service providers).

When the information on the available service is broadcasted, information indicating how to perform sensing by measuring a prescribed feature can be included.

Transmission format of the broadcasted information and contents included in the information will be explained in detail in the following description. For clarity and facilitation of explanation, this is generically named 'per region frequency policy information'.

Each of the CR based terminals 705a, 705b and 705c obtains the per region frequency policy information, compares the obtained information to its location, undergoes a cognitive process through a specification of a region corresponding to its location, and then established a communication environment. For this, each of the CR based terminals 705a, 705b and 705c should have a method of recognizing its accurate location. Self-location recognition via GPS or Galileo satellite is advantageously implemented without an additional cost owing to the CR terminal characteristics.

The above-described per region frequency policy information broadcasted by the policy information broadcaster is explained as follows.

Figure 8:
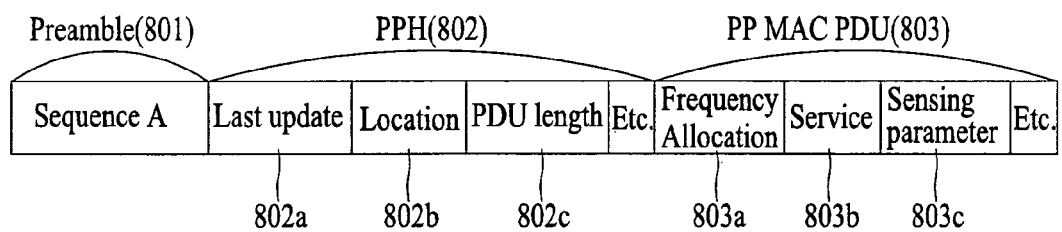
FIG. 8 is a diagram of a structure of a policy broadcasting packet including per region policy information according to one embodiment of the present invention.

FIG. 8 is a diagram of a structure of a policy broadcasting packet including per region policy information according to one embodiment of the present invention.

One embodiment of the present invention proposes a scheme of broadcasting the per region frequency policy information associated with FIG. 7 in a packet format including other necessary information. And, this is called 'policy broadcasting packet'.

First of all, a policy broadcasting packet according to one embodiment of the present invention can include a preamble 801 enabling a terminal to being synchronized with the policy broadcasting packet, a frequency policy profile header (PPH) 802 carrying information on transferred per region frequency policy information, and a frequency policy information (policy profile) MAC protocol data unit (PP MAC PDU) 803 for delivering frequency policy information (policy profile).

In the above structure, the preamble 801 includes specific sequence data (e.g., sequence A). And, a random sequence usable for enabling a CR based terminal to match synchronization with the policy information broadcaster can be used as the preamble 801.

The PPH 802 can include last update information 802a as information of count or time to enable the terminal to confirm that received information is latest information. This can be configured in a manner of incrementing the count or changing a time value if contents of the PDU are changed in the policy information broadcaster. For instance, if a packet of a policy information broadcaster is changed, a count is incremented by one. The packet is then broadcasted. In case of the count, if the count is equal to that of the terminal having received the broadcasted packet, policy associated information, i.e., PP MAC PDU is not updated. If the count is different from a former count previously received from the policy information broadcaster, the information is updated. Likewise, in case of the time, a time of transmitting a packet from a policy information broadcaster is compared to a previous time of receiving a packet, information can be updated into latest information.

The PPH 802 can include information 802b on a region to which a corresponding frequency packet is applied, e.g., location information in an information format about a range of longitude and latitude, coordinates including a longitude and latitude, and an applied information. Preferably, information 802c on a PDU length is included as well.

Meanwhile, the PP MAC PDU 803 can include at least one of a frequency allocation situation 803a in each region, a type 803b of service in an allocated frequency band, and parameter information 803c to sense an available frequency band in accordance with the corresponding service.

In particular, the frequency allocation situation includes information on a frequency band available for each region and can indicate that a frequency band available for a specific region includes a frequency band 1, a frequency band 2, and a frequency band 3. And, information on a type of a service on the allocated frequency band can indicate that a wireless LAN (WLAN) is serviced on the frequency band 1, that a wireless PAN (WPAN) is serviced on the frequency band 2, and that cellular communication is serviced on the frequency band 3.

The parameter information 803c for sensing an actual available frequency band according to each service is the information indicating whether a corresponding system can be easily found if prescribed information is calculated or detected in searching a system. For instance, the parameter information 803c can include information on a type of a sequence used in case of CDMA, information on a bandwidth and a preamble in case of OFDM, information on shift keying such as FM, AM and the like, information on cyclostationary characteristic and the like. Through this, the CR terminal is able to detect an actual available frequency band by sensing whether a corresponding frequency band in a corresponding service is used by a primary user, etc. In this case, the 'primary user' means a user who uses a service by a communication scheme (e.g., WLAN, WMAN, etc.: hereinafter called 'primary service') serviced in a previous corresponding frequency band instead of the CR communication.

Moreover, the PP MAC PDU 803 can include information on a frequency regulation situation including a power profile of each service and the like. For instance, specifications for power limit available for each region or service in radio communication can differ from each other. Hence, the present embodiment proposes that the information on the power regulations is set to be broadcasted to each user via the PP MAC PDU 803 and the like.

In case that there exist a plurality of providers each of which provides a specific service a terminal attempts to receive, the PP MAC PDU 803 preferably includes provider information for discriminating a system of a corresponding provider.

Besides, the PP MAC PDU 803 can include at least one information for sensing or changing a terminal setting such as a per region frequency allocation situation, a type of a service on an allocated frequency band, a spectrum mask for an available frequency band/inner and outer band in accordance with each service, a transmission power limit on each frequency band, and the like.

By broadcasting the frequency policy information, the CR terminal is able to efficiently sense an actual available frequency band by obtaining information on a frequency policy of a region corresponding to its location with ease.

According to another embodiment of the present invention, the above-explained frequency policy information can be transmitted via broadcast information within a service for the purpose of a specific service.

And, a method of defining a profile for frequency policy information set for each region in transmitting the frequency policy information and transmitting the corresponding configuration in a bit arrangement is possible as well.

A configuration of the policy information broadcaster who broadcasts the frequency policy information is explained as follows.

Figure 9:
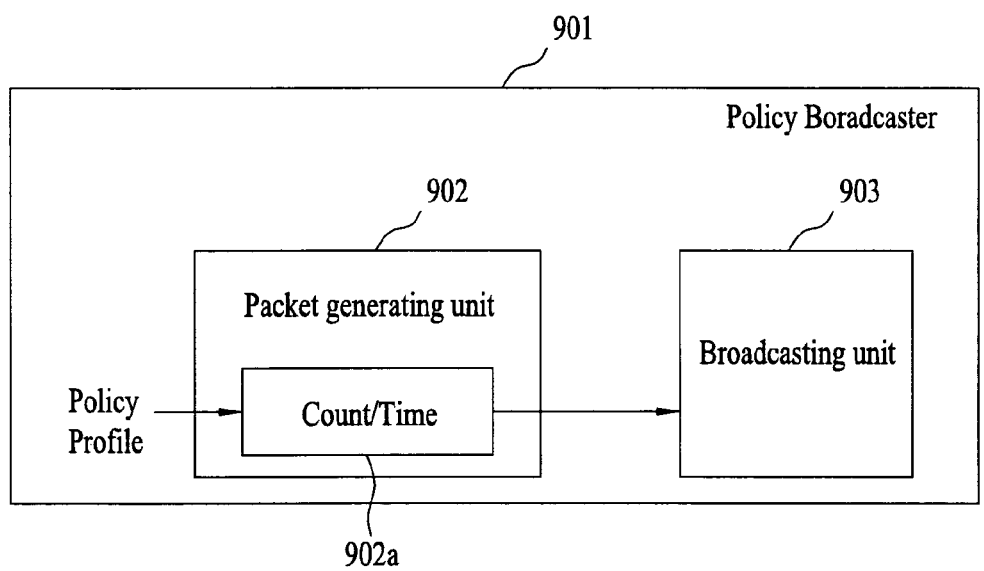
FIG. 9 is a block diagram of configurational features of a frequency policy information broadcaster according to one embodiment of the present invention.

FIG. 9 is a block diagram of configurational features of a frequency policy information broadcaster according to one embodiment of the present invention.

A frequency policy information broadcaster 901 according to one embodiment of the present invention, as shown in FIG. 9, can include a packet generating unit 902 and a broadcasting unit 903 in accordance with its functions.

The packet generating unit 902 receives information on a frequency policy and then generates a policy broadcasting packet shown in FIG. 8. If the received information on the frequency policy is changed, the packet generating unit 902 is able to increment a count or to insert information on a changed timing point in the policy broadcasting packet. For this, the packet generating unit 902 can include a count/time recording unit 902*a*. Preferably, the policy information inputted to the packet generating unit is updated in a cycle enough to accommodate a changed item of the corresponding frequency policy.

The broadcasting unit 903 having received the policy broadcasting packet generated by the packet generating unit 902 can broadcast the corresponding policy broadcasting packet in a predetermined cycle.

The policy information broadcaster 901 according to the present invention can become a random subject as long as has the above-explained configuration. A TV broadcasting station, a satellite or a random base station used for a communication system can play a role as the policy information broadcaster 901 by including the above-explained configuration. Alternatively, as mentioned in the foregoing description, a separate subject can be implemented to play a role as the policy information broadcaster 901.

Meanwhile, a process for a terminal to receive the aforesaid per region frequency policy information broadcast and to perform CR communication is explained as follows.

Figure 10:
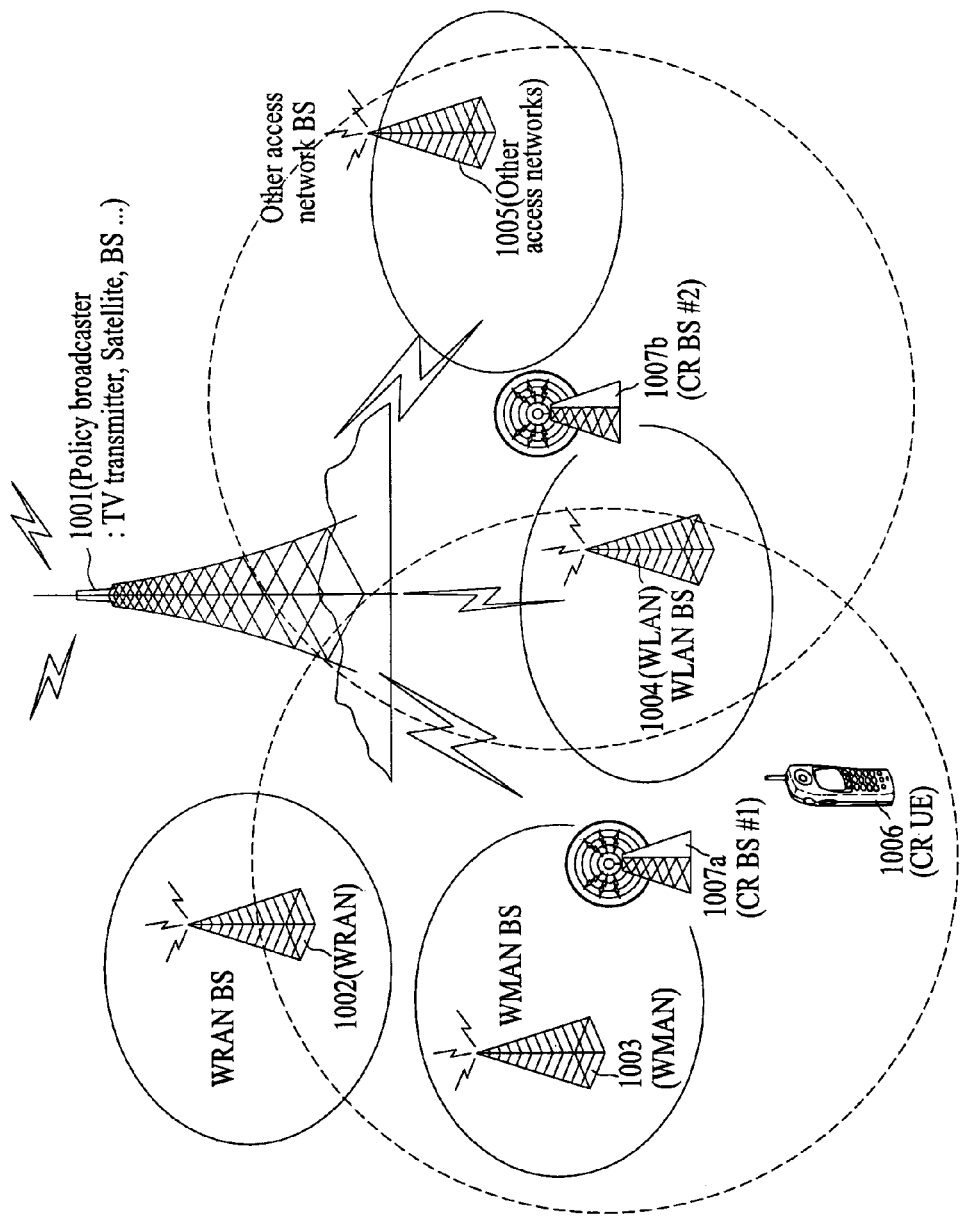
FIG. 10 is a diagram to explain a process for broadcasting frequency policy information according to one embodiment of the present invention and a corresponding cognizing process of a CR based terminal.

FIG. 10 is a diagram to explain a process for broadcasting frequency policy information according to one embodiment of the present invention and a corresponding cognizing process of a CR based terminal.

In particular, FIG. 10 depicts a process that a CR based terminal 1006 matches a synchronization with a policy broadcaster 100 and reads a message from a moment that a power of the CR terminal 1006 is turned on and also depicts a scenario of a case that the CR terminal 1006 attempts to access a service, e.g., a communication service of a WLAN 1004 or a WMAN 1003.

If the power of the CR based terminal 1006 is turned on, the CR based terminal 1006 matches synchronization with a policy broadcaster 1001 and then receives information associated with a frequency policy from a packet broadcasted by the policy broadcaster 1001. In this case, the terminal 1006 compares information lately received from the policy broadcaster 1001 to previously received information from the policy broadcaster 1001. If the information is changed, the terminal 1006 updates the previously received information. A presence or non-presence of the change of the information can be decided through the count or time of the last update information 802*a* included in the PPH 802 shown in FIG. 8.

Through the above-explained packet reception, the terminal 1006 receives a sensing method for an available system for each region, a corresponding frequency band, a frequency profile, whether a specific system actually exits, what kind of a feature parameter will be used to measure whether the specific system is currently used if the specific system actually exists, or the like from the policy broadcaster 1001. The terminal 1006 then obtains policy information corresponding to its current location from them.

For instance, if the terminal is located within an area of a CR BS #1 1007*a*, information included in a policy broadcasting packet as a service available for a bandwidth allocated to the corresponding location enables services of WMAN 1003, WLAN 1004 and WRAN 1002 and can include corresponding frequency band information per system, frequency profile, parameter information for a sensing per system, and the like.

In this case, FIG. 10 represents CR BS #1 1007*a* and CR BA #2 1007*b* as subjects separate from other service providing base stations WRAN BS, WMAN BS, WLAN BS, etc. Yet, CR BS can be assumed as a subject including WRAN BS, WMAN BS, WLAN BS and the like as base stations capable of providing services of WRAN, WMAN, WLAN, and the like. So, if services available for the area of the CR BS #1 1007*a* include the WRAN 1002, the WMAN 1003, and the WLAN 1004, the CR BS #1 1007*a* be regarded as including the WRAN BS, the WMAN BS, the WLAN BS, and the like. Of course, it is apparent to those skilled in the art that they can be respectively implemented as separate subjects if necessary.

Having received the packet, the terminal 1006 selects a specific service, e.g., the WMAN 1003 or the WLAN 1004. The terminal 1006 is then able to sense a frequency band corresponding to each of the systems to check whether a corresponding system actually exists or whether a specific frequency band is used by a primary user prior to searching the CR base station 1007*a*.

If the frequency band of the corresponding system is used by the primary user, the terminal 1006 reports to the CR base station 1007*a* that the primary user exists via a beacon or the like. If the primary user does not exist and if the frequency band is an available frequency band, the terminal obtains synchronization with the corresponding base station, e.g., the CR BS #1 1007*a* and then initiates a service.

Meanwhile, while the service with the CR base station 1007*a* continues, the CR terminal 1006 is able to receive policy information. If the policy information previously received from the policy broadcaster 1001 is different from policy information newly received from the policy broadcaster 1001, the terminal 1006 is able to newly update the previous information.

In the above-explained one embodiment of the present invention with reference to FIG. 10, the case that the policy broadcaster 1001 transmits the policy broadcasting packet including the per region frequency policy information in a broadcasting format has been described for example. In an available frequency band cognizing method and a CR communication method according to another embodiment of the present invention, the per region frequency policy information can be transmitted by an arbitrary scheme as long as the terminal 1006 can obtain the per region frequency policy information. For instance, a transmission of the per region frequency policy information can be carried out by on-demand of the policy broadcaster 1001 for example. Yet, in aspects of introductions of a plurality of terminals for CR communication, uplink resource waste in accordance with the request for the per region frequency policy information, and the like, the transmission in the above-explained broadcast form can be more preferable.

In the above-explained embodiment, the terminal 1006 executes a separate position obtaining step to obtain its location information. Yet, a location of terminal can be obtained from another random process for performing communication of the terminal. And, it is not mandatory for the available frequency band cognition and the CR communication according to the present invention.

The above-explained CR communication process is explained in detail as follows.

Figure 11:
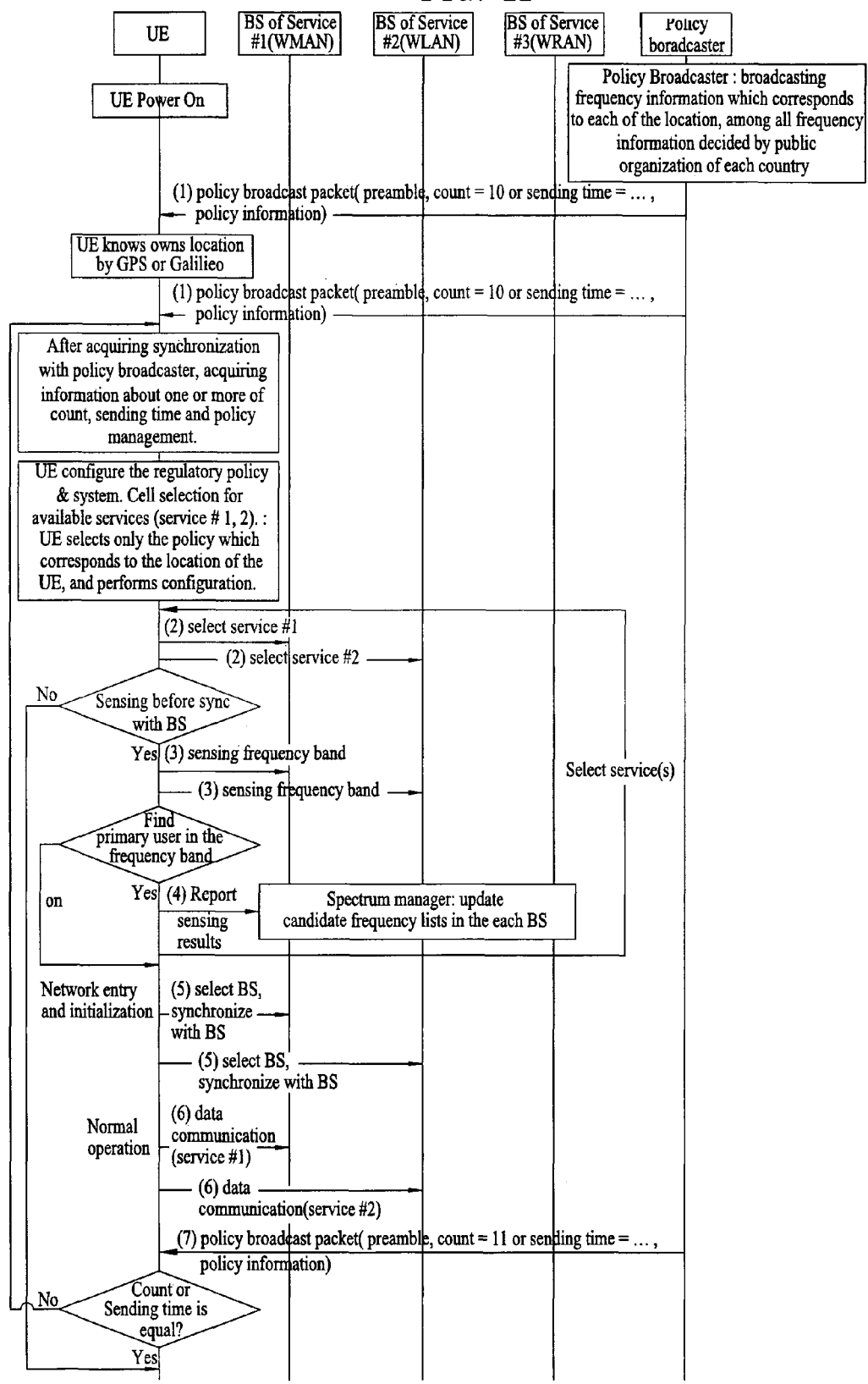
FIG. 11 is a diagram to explain an operation of a terminal and a signal exchanging scheme with each base station in a CR communication method according to one embodiment of the present invention.

FIG. 11 is a diagram to explain an operation of a terminal and a signal exchanging scheme with each base station in a CR communication method according to one embodiment of the present invention.

Before a power of a CR based terminal is turned on or the CR based terminal hands over into another base station, the terminal receives a policy broadcasting packet from a random system having a function of a policy broadcaster (step 1).

In this case, the policy broadcasting packet can include a preamble for the terminal to match synchronization with the policy broadcaster, information for confirming whether information received by the terminal is latest information, and per region frequency policy information (per region available service and corresponding frequency band, frequency allocation status, feature relevant information for sensing each system, etc.). The CR based terminal knows its location information via GPS, Galileo or the like and is able to execute a separate location information checking step if necessary.

Hence, the CR based terminal obtains the synchronization with the policy broadcaster, obtains a count or time and the policy relevant information included in the received packet, and then selects to cognize a frequency policy corresponding to a region where it is currently located.

Subsequently, the CR based terminal selects a specific service (e.g., WMAN, MLAN, and more particular, a system providing the service to be received such as a WMAN system A by a service provider A, a WLAN system B by a service provider B) to be serviced from services available on the corresponding frequency band (step 2).

Prior to obtaining the synchronization with a CR base station, if the CR based terminal attempts to perform a sensing for checking whether a corresponding system exists or whether a primary user exists, the CR based terminal senses the service or system selected in the step 2 based on the information obtained in the step 1 (step 3).

If the corresponding frequency band is occupied by the primary user, the CR based terminal is able to report it to the CR base station (i.e., CR base station including BS providing service #3 (WRAN), BS providing service #2 (WLAN), and BS providing service #3 (WRAN)) (step 4). In this case, the terminal is able to make the report using a beacon or the like because the synchronization with the CR base station has not been acquired yet. The CR base station having received the report, and more particularly, a frequency manager of the CR base station can use it in updating candidate frequency list information for frequency allocation in each service base station. Meanwhile, if the primary user is unable to use both of the service and system selected by the terminal, the terminal is able to select another service included in the per region frequency policy information.

Subsequently, if not the primary user but the available frequency band exists in the frequency band of the service (WMAN, WLAN) or system selected by the CR based terminal, the terminal executes a network entry and initialization process (step 5) for matching synchronization with a CR base station #1 and a series of data communication process (step 6) for exchanging data between a CR base station and a CR based terminal.

The CR based terminal is able to keep obtaining frequency policy information through the policy broadcaster (step 7). If the per region frequency policy information is changed, the information previously received by the CR based terminal is updated.

Unlike the above explanation, according to another embodiment of the present invention, if a CR terminal selects a specific primary service instead of selecting a CR service, the terminal decides a presence or non-presence of a corresponding service only through a sensing process. If the corresponding service exists, the terminal is able to access a base station or AP providing the corresponding service. If the corresponding service does not exist actually, the terminal is able to select a new service.

Moreover, if a location of a terminal is changed or a power of the terminal is turned on, as mentioned in the foregoing description, the terminal itself is configured in accordance with a series of orders and then recognizes a service and an available bandwidth. Yet, if a terminal has to update regulation information in the course of action, the available bandwidth can be secured in a manner of re-executing the steps from the sensing process of the step 3 in FIG. 11.

A feature configuration of a terminal for executing CR communication by cognizing an available frequency band, as mentioned in the foregoing description, is explained as follows.

Figure 12:
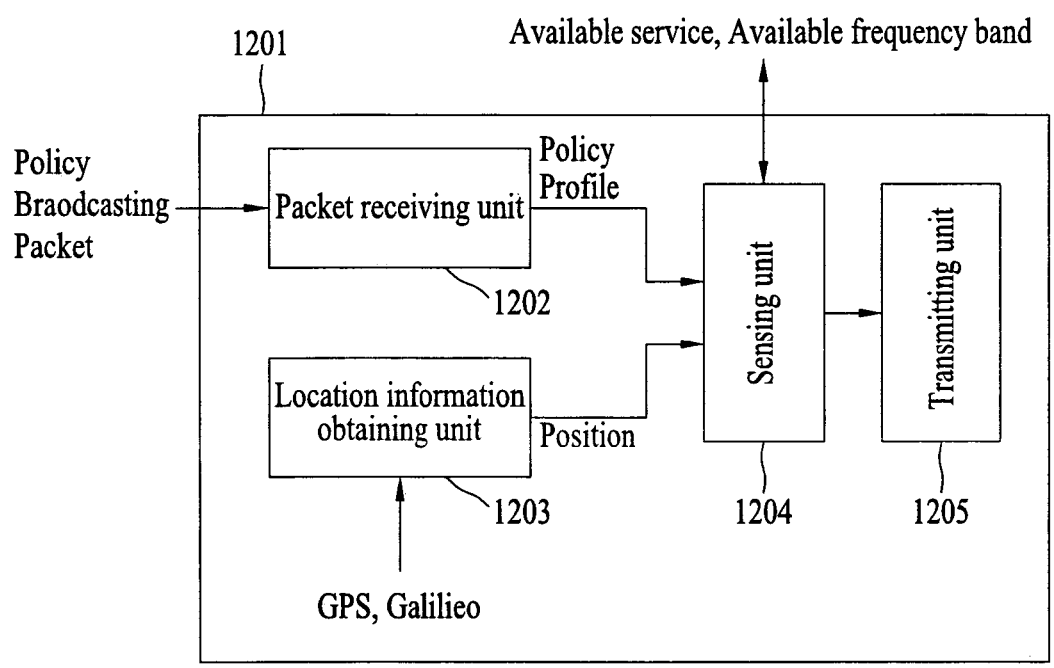
FIG. 12 is a block diagram of configurational features of a terminal for cognizing an available frequency band and performing CR communication using the same.

FIG. 12 is a block diagram of configurational features of a terminal for cognizing an available frequency band and performing CR communication using the same.

Referring to FIG. 12, a terminal 1201 according to one embodiment of the present invention can include a packet receiving unit 1202, a location information obtaining unit 1203, a sensing unit 1204, and a transmitting unit 1205.

First of all, the packet receiving unit 1202 receives a policy broadcasting packet broadcasted by a policy broadcaster. The received policy broadcasting packet includes a preamble for the terminal 120 to match synchronization with the policy broadcaster. If the terminal 1201 acquires synchronization with the policy broadcaster through the preamble, the packet receiving unit 1202 obtains a per region frequency allocation status, a type of an available service for each frequency band, a presence or non-presence of availability of each service, and sensing parameter information for sensing an available frequency band and the like from the received packet and then delivers the obtained information to the sensing unit 1204.

Meanwhile, the terminal according to one embodiment of the present invention can include the location information obtaining unit 1203 obtaining its location information to extract corresponding frequency policy information from the above-explained per region frequency policy information. And, the location information obtaining unit 1203 is able to obtain its location information via GPS, Galileo satellite or the like.

Having received the frequency policy information from the packet receiving unit 1202 and its location information from the location information obtaining unit 1203, the sensing unit 1204 is able to obtain information on an available frequency band by sensing whether a selected service actually exists and whether an actually available frequency band exists for the corresponding service if the selected service exists, through the received informations. Thus, in case that the sensing unit 1204 secures the service for the CR communication and the available frequency band, the transmitting unit 1205 is able to initiate the CR communication through the secured service and available frequency band.

FIG. 12 shows that the packet receiving unit 1202 delivers the whole received per region frequency policy information to the sensing unit 1204 and that the sensing unit 1204 having received the location information obtained by the location information obtaining unit 1203 extracts the corresponding policy information from the whole per region frequency policy information and then uses the extracted information for the sensing. Alternatively, if necessary, the packet receiving unit 1202 receives the location information obtained by the location information obtaining unit 1203 and then provides the frequency policy information of the region, where it is located, in the whole per region policy information to the sensing unit only. As long as the above-explained functions are carried out to enable the terminal 1201 shown in FIG. 12 to execute the CR communication scheme, it is apparent to those skilled in the art that the feature configuration can be differently implemented in accordance with the discrimination of each of the functions.

For instance, a terminal according to another embodiment of the present invention includes a packet receiving unit receiving a policy broadcasting packet including the frequency policy information per region from the policy broadcaster performing a broadcast of the frequency policy information for the cognitive radio communication.

And, the terminal according to another embodiment of the present invention can further include a processor cognizing the frequency policy information delivered to the terminal and changing a setting of the terminal in accordance with the policy information.

Moreover, the terminal according to another embodiment of the present invention can further include a processor cognizing a plurality of frequency policy informations delivered to the terminal, a location information obtaining unit obtaining a current location of the terminal, a selecting unit selecting a frequency policy in accordance with the location, and a setting unit changing a setting of the terminal in accordance with the selected frequency policy information.

Besides, the terminal according to another embodiment of the present invention can further include a sensing unit sensing an available frequency band in accordance with the frequency policy corresponding to the location obtained by the location information obtaining unit in the per region frequency policy information and a transmitting unit initiating communication via the available frequency band if the sensing unit senses the available frequency band.

The descriptions of the respective embodiments of the present invention provide a subject for broadcasting a policy broadcasting packet to enable a terminal to obtain information on a frequency policy of a corresponding region among random regions and disclose a frequency policy information broadcasting method and apparatus thereof.

As mentioned in the foregoing description, another object of the present invention is to disclose a problems of a related art superframe structure in executing the CR communication and to provide an enhanced superframe structure and a communication method using the same to solve the problem.

For this, a superframe structure and a frame structure used for IEEE 802.22 system are explained as follows.

An example of a superframe structure and a frame structure used in IEEE 802.22 system will be explained.

According to one embodiment, a superframe includes a PHY preamble, a superframe control header (SCH), and a plurality of frames.

The preamble is a specific sequence data placed at a first symbol of each superframe, exists per TV channel, and is used for a CPE to match synchronization with a base station (BS).

The SCH includes information about the superframe. And, the SCH includes a system type available for a current band, a superframe number, a number of frames included in the superframe, a presence or non-presence of channel combination, information on a quiet period, and the like.

And, the frame is a data sequence channel for a predetermined period due to a physical characteristic and includes a downlink subframe and an uplink subframe. One superframe includes sixteen frames (10 ms).

According to another embodiment, a frame includes a preamble, a frame control header (FCH), a burst, and the like. The frame further includes a DL-MAP located in a channel area of a same symbol section of the FCH, a UL-MAP located at a start timing point of a first burst, and a DCD/UCD as a MAC message announcing a physical characteristic in downlink/uplink channel.

The preamble, which is a specific sequence data placed at a first symbol of each frame, is used for a mobile station (MS) to match synchronization with a BS. The DL-MAP/UL-MAP is a MAC message notifying channel resource allocation in downlink/uplink to a terminal.

And, the burst is a unit of data received or transmitted by a terminal. A size and position of the burst are informed by the DL-MAP/UL-MAP message.

Meanwhile, in case that a CPE for a single channel newly enters a network in a system using the above-configured superframe and frame structures, a related art method is explained as follows.

An example of a related art announcement process for providing a service to CPE for a signal channel mode will be explained.

IEEE 802.22 system enables multi-channel combination and a base station modifies a superframe structure in accordance with performance of CPE.

In this example, a broadband mode CPE receives data from a frame, in which three unit channels (e.g., unit channels t−1, t and t+1) are combined into one, in an $N^{th}$ superframe.

Each terminal is capable of decoding a superframe preamble and SCH per channel. If a terminal attempting to enter a network is a CPE in a single mode, the terminal transmits a fact that the entered CPE is in the single mode to a base station via an alert window (AW). The base station having received the fact separates a channel combined in an $(N+1)^{th}$ superframe (superframe n+1) into the respective channels, modifies a frame structure to enable the single-mode terminal to be serviced, and then transmits the modified frame.

Thus, the related art communication scheme, i.e., a scheme, of which standardization is in progress, proposes a superframe structure that considers both a narrowband mode CPE and a broadband mode CPE. Yet, in a current superframe structure, in order for a narrowband mode support terminal is serviced by a base station in a superframe having several channel combined together, it is possible in a superframe transmitted after the base station has decided whether the terminal is in a single mode. And, a narrowband mode terminal is unable to be serviced by the base station in the middle of a superframe, i.e., a frame section for receiving data from the base station. If a narrowband mode terminal attempting to move away into another channel in the course of being serviced from a prescribed channel, and more particularly, a mobile terminal attempts to enter a network, there occurs a problem that a service is disconnected from a base station before receiving a next superframe after completion of separating the combined channels.

Hence, the present invention proposes a superframe structure to enable a base station to support a seamless communication service for terminals, which differ from each other in performance, i.e., in narrowband or broadband mode, based on CR. In particular, in configuring a superframe, an area for a narrowband terminal is basically allocated to a frame structure within a superframe structure and the rest of the areas within the superframe are allocated for a broadband mode terminal to be serviced.

In order to notify a position of a resource area for a narrowband terminal to a terminal having entered a network in the middle of a corresponding superframe section, position information is included in FCH and/or MAP information part within the superframe. In this case, the FCH and MAP information parts are sections including information on a corresponding frame. For clarity and convenience of explanation, the FCH and MAP information parts are generically named 'header part' of a unit resource area in the following description. In this case, the 'unit resource area' indicates a resource area included in a block discriminated by a single channel and a single frame within a superframe.

Meanwhile, the position information can be included in the FCH and/or MAP information parts of the entire unit resource areas within the superframe. Alternatively, the position information can be limitedly inserted in the FCH and/or MAP information unit of a unit resource area belonging to a resource area for a narrowband terminal only. So, the inclusion of the position information can differ in accordance with each implement.

In embodiments to satisfy the above general conditions, 1) a method of discriminating whether a narrowband mode is supported with reference to a channel region, 2) a method of discriminating with reference to a time region, and 3) a method of discriminating with reference to channel and time regions are explained with reference to the drawings as follows.

Another example of a superframe structure enabling at least one channel region to support a narrowband mode user equipment (UE) according to one embodiment of the present invention will be explained.

Even if a frequency band allocated to a superframe by excluding an already used frequency band is a broadband, a method is configured in a manner that at least one channel is used by a narrowband mode terminal.

An area serviceable by a narrowband mode terminal is also serviceable by a broadband mode terminal as well, which corresponds to an area where both of the narrowband mode and the broadband mode enable synchronization. Thus, a frame is constructed in a manner of enabling the rest area except the area available for both of the narrowband mode and the broadband mode simultaneously to enable a broadband service.

In this example, a position of a channel enabling a service for both a narrowband terminal and a broadband terminal, as can be indicated by a channel t+1, can be obtained through FCH and/or MAP information within a frame.

More preferably, in case that position information of the above channel is inserted in the header part of every unit resource area included in the channel region, even if a terminal enters a network at a random timing point within a superframe period, it is able to know which channel supports a narrowband mode.

A superframe structure described above is not limited to a specific channel position and size except that at least one channel for a narrowband mode terminal is assigned. Yet, in a channel of a frame including a quiet period for in-band sensing for a terminal or a base station to search a band unused by previous users, a channel section for the narrowband mode communication is not allocated.

According to one embodiment of the present invention, it is unnecessary that a multiple channel mode and a single channel mode provide the same service at the same time. Instead, they can set quiet periods at different times, respectively. Namely, in setting quiet periods, a quiet period of a multiple channel mode and a quiet period of a single channel mode need not be given at the same time if frames of the two modes are discontinuous on a physical channel.

Meanwhile, it is able to additionally insert position information of at least one channel to provide a service to the narrowband mode terminal in a superframe control header (SCH).

In this case, if the SCH is used in the same form in every channel region, it is unnecessary to insert different information for each channel. So, implementation is facilitated. And, it is also advantageous that an item common to channels needs not to be repeatedly indicated. Yet, 'list information' indicating whether a narrowband mode is supported should be included for every channel. So, a necessary bit number can be raised.

On the other hand, if SCH is differentiated for each channel, a number of bits required for indicating whether each channel supports a narrowband mode can be lowered. Yet, it may be disadvantageous that an item included in common to every channel should be repeatedly inserted. And, its implementation can be complicated more or less.

Thus, by inserting the position information of the narrowband mode support channel in the SCH additionally, the base station is able to deliver the position of the channel region supporting the narrowband mode terminal more stably. And, the narrowband mode terminal can stably obtain the position of the narrowband mode support channel within the whole superframe as well.

Details of a method of implementing the above-configured superframe structure are explained as follows.

First of all, when at least one channel keeps being used as a narrowband mode in a superframe without changing a channel supporting the narrowband mode, if SCH includes information on the channel, the SCH can be configured as Table 1 or Table 2. Of course, as mentioned in the foregoing description, in case that information on a channel supporting a narrowband mode is included in a header part of a unit resource area of a corresponding region, a terminal entering a network in the middle of a superframe can obtain a position of the channel supporting the narrowband mode. By inserting the corresponding information in the SCH, information can be delivered more stably. Table 1 exemplarily shows a case of applying a same SCH to every channel, while Table 2 exemplarily shows a case of applying a different SCH to each channel.

TABLE 1

| Syntax | Size | Notes |
| --- | --- | --- |
| Superframe_Control_Header_Format( ) { | | 1 OFDM symbol length. Transmitted by modulation/coding scheme known to public (e.g., QPSK rate ½) |
| ST = 0 | 6 bits | System type Indicating a type of system that uses this band. |
| CT | 1 bit | Content type Indicating a type of content following SCH transmission. Superframe = 0 CBP beacon = 1 |
| Superframe Number | 8 bits | Positive integer indicating a superframe number (modulo 255). This field can be incremented by 1 for each new superframe. |
| FS | 4 bits | Frame per superframe Indicating a number of frames within superframe. Frames within superframe have fixed sizes within superframe. |
| FDC | 8 bits | Frame sustain period code |
| TTQP | 16 bits | Time for a quiet period. Time taken for a next scheduled quiet period. This plays a role in synchronizing quiet periods of overlapped BSs. This TTQP is divided into two subfields, time scale and time. |

TABLE 1-continued

| Syntax | Size | Notes |
| --- | --- | --- |
| | | Time scale subfield specifies a scale of time subfield as it is. Time subfield includes 15-bit unsigned integer number. |
| DQP | 16 bits | Sustain time of quiet period Estimated sustain period of a next scheduled quiet period. This is specified in a manner similar to that of TTQP field. |
| PP | 1 bit | Presence of Preamble Indicating whether a preamble of a next frame exists. For example, if a cell operates on a single physical channel (i.e., TV), frame preamble is unnecessary. |
| Tx ID | 48 bits | Address uniquely indicating transmitter (CPE or BS) of SCH |
| CN | 8 bits | Channel number Indicating a start physical channel (i.e., TV) used by BS |
| NC | 2 bits | Channel number If channel combination is performed, this field indicates a number of additionally consecutive physical channels (i.e., TV) used by BS. In case of basic mode, NC = 2 (i.e., two additional TV channels). This is interpreted as total three physical channels are combined. |
| Narrowband Number List | 8 bits | Narrowband number list Indicating list of channel supporting narrowband mode CPE |
| AW Present | 1 bit | Presence of alert window (AW) Deciding whether AW exists as a portion of first frame in superframe structure |

TABLE 1-continued

| Syntax | Size | Notes |
|---|---|---|
| BFB | 16 bits | 0: AW non-presence<br>1: AW presence<br>Combined frame bitmap<br>If BS operated in combined mode and if single channel mode CPE needs to be supported, this field indicates which band is combined for each frame of superframe and which band is a single channel.<br>Bit = 0: Corresponding frame is combined.<br>Bit = 1: Corresponding frame is for TV channel. |
| GIF | 1 bit | Guard interval element<br>Specifying GIF used by physical layer in frame transmission of this superframe:<br>4 = Default mode used for superframe transmission |
| Length | 8 bits | Length of information following SCH |
| IEs | variable | Selective information elements transmittable with SCH: MAC version, Current transmission power, Part 74 confirmation, Position configuration information |
| HCS | 8 bits | Header search sequence |
| } | | |

TABLE 2

| Syntax | Size | Notes |
|---|---|---|
| Superframe_Control_Header_Format( )<br>{ | | 1 OFDM symbol length.<br>Transmitted by modulation/coding scheme known to public (e.g., QPSK rate ½) |
| ST = 0 | 6 bits | System type<br>Indicating a type of system that uses this band. |
| CT | 1 bit | Content type<br>Indicating a type of content following SCH transmission. |
| Band Type | 1 bit | Superframe = 0<br>CBP beacon = 1<br>Band type<br>Indicating whether this channel supports narrowband mode CPE<br>Narrowband mode CPE supported = 1 |
| Superframe Number | 8 bits | Positive integer indicating a superframe number (modulo 255). This field can be incremented by 1 for each new superframe. |
| FS | 4 bits | Frame per superframe<br>Indicating a number of frames within superframe.<br>Frames within superframe have fixed sizes within superframe. |
| FDC | 8 bits | Frame sustain period code |
| TTQP | 16 bits | Time for a quiet period.<br>Time taken for a next scheduled quiet period. This plays a role in synchronizing quiet periods of overlapped BSs.<br>This TTQP is divided into two subfields, time scale and time. Time scale subfield specifies a scale of time subfield as it is.<br>Time subfield includes 15-bit unsigned integer number. |
| DQP | 16 bits | Sustain time of quiet period<br>Estimated sustain period of a next scheduled quiet period.<br>This is specified in a manner similar to that of TTQP field. |
| PP | 1 bit | Presence of Preamble<br>Indicating whether a preamble of a next frame exists.<br>For example, if a cell operates on a single physical channel (i.e., TV), frame preamble is unnecessary. |

TABLE 2-continued

| Syntax | Size | Notes |
|---|---|---|
| Tx ID | 48 bits | Address uniquely indicating transmitter (CPE or BS) of SCH |
| CN | 8 bits | Channel number Indicating a start physical channel (i.e., TV) used by BS |
| NC | 2 bits | Channel number If channel combination is performed, this field indicates a number of additionally consecutive physical channels (i.e., TV) used by BS. In case of basic mode, NC = 2 (i.e., two additional TV channels). This is interpreted as total three physical channels are combined. |
| AW Present | 1 bit | Presence of alert window (AW) Deciding whether AW exists as a portion of first frame in superframe structure 0: AW non-presence 1: AW presence |
| BFB | 16 bits | Combined frame bitmap If BS operated in combined mode and if single channel mode CPE needs to be supported, this field indicates which band is combined for each frame of superframe and which band is a single channel. Bit = 0: Corresponding frame is combined. Bit = 1: Corresponding frame is for TV channel. |
| GIF | 1 bit | Guard interval element Specifying GIF used by physical layer in frame transmission of this superframe: 4 = Default mode used for superframe transmission |
| Length | 8 bits | Length of information following SCH |
| IEs | variable | Selective information elements transmittable with SCH: MAC version, Current transmission power, Part 74 confirmation, Position configuration information |
| HCS | 8 bits | Header search sequence |

In Table 1 and Table 2, Table 1 indicates a case of using common SCH for every channel region. 'Narrowband Number List' includes information indicating whether a narrowband mode for every channel is supported. For this, 8 bits are allocated. Yet, Table 2 shows a case that a different SCH is inserted in each channel. And, Table 2 differs from Table 1 in that 1 bit is allocated to 'Band Type' to indicate whether a narrowband mode of a corresponding channel itself is supported, without 'Narrowband Number List' of Table 1.

Referring to Table 1 and Table 2, a channel number for a narrowband mode is specified in SCH. And, in each frame, it is represented whether a corresponding frame corresponds to a narrowband type.

As mentioned in the foregoing description, the aforesaid position information can be included in each unit resource area, i.e., in FCH and/or DL-MAP information part of each frame included in a corresponding channel. Table 3 shows an example of a case that position information is included in DL-MAP.

TABLE 3

| Syntax | Size | Notes |
|---|---|---|
| DS-MAP_Message_Format ( ) { | | |
| Management Message Type = 1 | 8 bits | |
| Synchronization Field | 16 bits | |
| DCD Count | 8 bits | Matching a value of a configuration change count of DCD describing a burst profile to which this map will be applied |
| BS ID | 48 bits | |
| Band ≤ type | Q bit | Band type Indicating channel type for narrowband mode CPE: Narrowband mode CPE support = 1 |
| Begin PHY Specific Section { For (i=1: i≤n: i++) { DS-MAP_IE( ) } } | variable | PHY unique |
| If (!byte_boundary) Padding Nibble } | 4 bits | |

Referring to Table 3, in transmitting channel information for supporting a narrowband mode using DL-MAP, if 'Band Type' indicates '1', it means that a channel including it supports a narrowband mode CPE. If 'Band Type' indicates '0', it means that a channel does not support a narrowband mode CPE. Through this, a terminal is able to obtain information indicating which channel supports a narrowband mode even if entering a network for a super frame period.

Meanwhile, a method of performing communication between a terminal and a base station using the above-configured superframe structure is explained as follows.

In a communication method according to the present invention, in performing communication using a superframe enabling at least one channel to support a narrowband mode, as mentioned in the foregoing description, a base station inserts position information in a unit resource area of a corresponding channel region, i.e., in a FCH and/or DL-MAP information part of a frame to inform a terminal of a corresponding channel region. Moreover, the terminal is able to obtain such a channel position through FCH and/or DL-MAP as well as SCH of a superframe as well. Through this, a seamless communication service can be provided to a narrowband mode terminal entering a network in the middle of a superframe.

Meanwhile, the base station is able to additionally insert position information of a narrowband mode support channel in SCH as well as the aforesaid unit resource area. In this case, if every channel is made to have the same SCH, a list indicating a presence or non-presence of a narrowband mode support of each channel is inserted in the SCH. In case that a different SCH is inserted in each channel, it is able to insert a presence or non-presence of a narrowband channel support of each channel. Besides, a base station is able to perform various operations using the above-explained superframe structure to perform efficient communication with a narrowband mode terminal. And, this can be apparently induced to those skilled in the art from the above-explained description.

A superframe structure for providing a seamless communication service to a narrowband terminal according to a second embodiment of the present invention, in which a presence or non-presence of a narrowband mode support is discriminated with reference to a time, is explained as follows.

Another example of a superframe structure enabling at least one frame region to support a narrowband mode user equipment (UE) according to one embodiment of the present invention will be explained.

According to this example, at least one frame region for supporting a narrowband mode terminal can be introduced. This method designates a frame for enabling a narrowband mode terminal to receive a service through FCH and/or MAP of frame. By enabling FCH and/or MAP of each frame to represent whether a corresponding frame supports a narrowband mode, a terminal entering a network within a superframe period is able to discriminate a frame supporting a narrowband mode.

Yet, unlike FIG. 8 showing the case that a single channel region continuously supports a narrowband mode, if at least one frame is set to support a narrowband mode, a frame section for supporting a different narrowband mode is designated in a previous frame region. This is preferable because a frame position can be obtained more stably. In this case, a frame for which an initial narrowband mode is supported is designated by SCH and each frame for which a narrowband mode is supported can be made to designate a frame for which a next narrowband mode is supported. Like the case of the previous example, there exists at least one frame for a narrowband mode terminal. The narrowband mode terminal is serviceable on a narrowband only. Yet, on a band enabling the narrowband mode terminal to be serviced, a broadband mode terminal can be serviced as well.

A method of implementing the above-described superframe structure is explained as follows.

As mentioned in the foregoing description, it is able to implement that a frame region indicates whether the corresponding frame region itself supports a narrowband mode. More preferably, in a frame for supporting an initial narrowband mode, as shown in Table 4 and Table 5, a period to a period to a next frame enabling a narrowband mode and a frame number are announced.

Table 4 and Table 5 show DIUC 9downlink interval usage code) as an information element (IE) included in DL-MAP and a corresponding narrowband IE format, respectively.

TABLE 4

| DIUC | Usage |
| --- | --- |
| 0 | Self-coexistence (Active mode) |
| 1 | Self-coexistence (Passive mode) |
| 2-12 | Burst profiles |
| 13 | PAPR reduction |
| 14 | End of map |
| 15 | Extended DIUC |

TABLE 5

| Syntax | size | Notes |
| --- | --- | --- |
| DS_Extended_IE( ) { | | |
| Extended DIUC | 4 bits | 0x00 |
| Length | 4 bits | |
| Frame Number | 8 bits | Indicating a next single mode frame number used by BS |
| Duration from the previous Narrowband Frame | 16 bits | Sustain period from the previous narrowband frame |
| } | | |

Referring to Table 5, DL-MAP of a frame supporting a narrowband mode allocates 8-bit information to 'Frame number' to indicate a number of a next single mode frame used by a BS and also allocates 16-bit information to 'Duration from the previous Narrowband Frame' to indicate a sustain period from a previous narrowband frame.

Thus, by inserting information on a next frame supporting a narrowband mode, a narrowband mode terminal entering a network within a superframe period can be immediately provided with a service in a next narrowband mode frame section without waiting for a next superframe for communication with a base station.

A method of performing communication between a base station and a terminal using the superframe having the above-explained structure is explained as follows.

In a communication method according to one embodiment of the present invention, as mentioned in the foregoing description, in performing communication using a superframe enabling at least one frame to support a narrowband mode, a base station inserts position information in a unit resource area of a corresponding frame region, i.e., in FCH and/or DL-MAP information part of a frame to inform a terminal of a corresponding frame region. And, the terminal is also able to obtain such a channel position through FCH and/or DLP-MAP as well as SCH of the superframe. Through this, a narrowband mode terminal entering a network in the middle of the superframe can be provided with a seamless communication service.

Meanwhile, the base station is able to additionally insert position information of a narrowband mode support channel in the SCH as well as the aforesaid header part of the unit resource area. In this case, position information of a frame initially supporting a narrowband mode can be preferably delivered to the narrowband mode terminal through the SCH.

A superframe structure for providing a seamless service to a narrowband terminal according to a third embodiment of the present invention, in which a presence or non-presence of a narrowband mode support is discriminated with reference to both a time and a channel, is explained as follows.

Another example of a superframe structure for setting a prescribed region distributed and located in a prescribed channel region and a prescribed frame region to a region for supporting a narrowband mode UE according to one embodiment of the present invention will be explained.

Unlike the superframe for setting at least one channel region supporting a narrowband mode in the previous example or the superframe for setting at least one frame region supporting a narrowband mode in the another previous example, a frame structure supporting a narrowband mode and a superframe structure changing a channel are proposed.

Namely, at least one unit resource area supporting a narrowband mode is located in a manner of being distributed to a prescribed channel and a frame region such as a frame 1 region of a channel t+1 region, a frame m-1 region of a channel t-1 region, and a frame m region of a channel t+1 region.

In this case, like the case of setting at least one narrowband mode frame region according to the previous example, in a manner that each unit resource area indicates whether the corresponding unit resource area itself supports a narrowband mode, a terminal entering a network within a superframe period is able to confirm the unit resource area supporting the narrowband mode.

Yet, like the embodiment shown in the previous example, since a narrowband mode support resource area of the present example does not exist in a single channel continuously, it is preferable that information on a next narrowband support unit resource area is notified in a previous narrowband support unit resource area. In this case, it is preferable that a frame or channel for which an initial narrowband mode is supported is notified in SCH and that a next frame or channel is designated in the frame supporting the initial narrowband mode.

Meanwhile, a method of implementing the superframe structure concretely is explained as follows.

A structure of a superframe is explained in the following description on the assumption that position information of a narrowband mode support unit resource area is inserted in SCH and FCH and/or MAP area of each frame among the above-explained embodiments and that position information of the narrowband mode support unit resource area inserted in the FCH and/or MAP area of the each frame is the information on a next narrowband mode support unit resource area.

In this case, if SCH of every channel is identical, 'list of channel and frames' supporting a narrowband mode can be informed. On the other hand, if SCHs of entire channels differ from each other, 'list of frames' supporting a narrowband mode included in a corresponding channel is just informed. Theses cases are represented in Table 6 and Table 7, respectively.

TABLE 6

| Syntax | Size | Notes |
|---|---|---|
| Superframe_Control_Header_Format( ) { | | 1 OFDM symbol length. Transmitted by modulation/coding scheme known to public (e.g., QPSK rate ½) |
| ST = 0 | 6 bits | System type Indicating a type of system that uses this band. |
| CT | 1 bit | Content type Indicating a type of content following SCH transmission. Superframe = 0 CBP beacon = 1 |
| Superframe Number | 8 bits | Positive integer indicating a superframe number (modulo 255). This field can be incremented by 1 for each new superframe. |
| FS | 4 bits | Frame per superframe Indicating a number of frames within superframe. Frames within superframe have fixed sizes within superframe. |
| FDC | 8 bits | Frame sustain period code |
| TTQP | 16 bits | Time for a quiet period. Time taken for a next scheduled quiet period. This plays a role in synchronizing quiet periods of overlapped BSs. This TTQP is divided into two subfields, time scale and time. Time scale subfield specifies a scale of time subfield as it is. Time subfield includes 15-bit unsigned integer number. |
| DQP | 16 bits | Sustain time of quiet period Estimated sustain period of a next scheduled quiet period. This is specified in a manner similar to that of TTQP field. |
| PP | 1 bit | Presence of Preamble Indicating whether a preamble of a next frame exists. For example, if a cell operates on a single physical channel (i.e., |

TABLE 6-continued

| Syntax | Size | Notes |
|---|---|---|
| | | TV), frame preamble is unnecessary. |
| Tx ID | 48 bits | Address uniquely indicating a transmitter (CPE or BS) of SCH |
| CN | 8 bits | Channel number Indicating a start physical channel (i.e., TV) used by BS |
| NC | 2 bits | Channel number If channel combination is performed, this field indicates a number of additionally consecutive physical channels (i.e., TV) used by BS. In case of basic mode, NC = 2 (i.e., two additional TV channels). This is interpreted as total three physical channels are combined. |
| AW Present | 1 bit | Presence of alert window (AW) Deciding whether AW exists as a portion of first frame in superframe structure 0: AW non-presence 1: AW presence |
| BFB | 16 bits | Combined frame bitmap If BS operated in combined mode and if single channel mode CPE needs to be supported, this field indicates which band is combined for each frame of superframe and which band is a single channel. Bit = 0: Corresponding frame is combined. Bit = 1: Corresponding frame is for TV channel. |
| Number of the Narrowbands ! = 0 { for (i=1; i≤n; i++) { | | N means a number of narrowband |
| Narrowband number | 8 bits | Narrowband number Indicating a list of number of channel supporting narrowband mode CPE |
| Frame Numbers | 8 bits | Indicating list of frame number supporting narrowband mode CPE |
| } | | |
| GIF | 1 bit | Guard interval element Specifying GIF used by physical layer in frame transmission of this superframe: 4 = Default mode used for superframe transmission |
| Length | 8 bits | Length of information following SCH |
| IEs | variable | Selective information elements transmittable with SCH: MAC version, Current transmission power, Part 74 confirmation, Position configuration information |
| HCS | 8 bits | Header search sequence |
| } | | |

TABLE 7

| Syntax | Size | Notes |
|---|---|---|
| Superframe_Control_Header_Format( ) { | | 1 OFDM symbol length. Transmitted by modulation/coding scheme known to public (e.g., QPSK rate ½) |
| ST = 0 | 6 bits | System type Indicating a type of system that uses this band. |
| CT | 1 bit | Content type Indicating a type of content following SCH transmission. Superframe = 0 CBP beacon = 1 |
| Superframe Number | 8 bits | Positive integer indicating a superframe number (modulo 255). This field can be incremented by 1 for each new superframe. |
| FS | 4 bits | Frame per superframe Indicating a number of frames within superframe. Frames within superframe have fixed sizes within superframe. |

TABLE 7-continued

| Syntax | Size | Notes |
|---|---|---|
| FDC | 8 bits | Frame sustain period code |
| TTQP | 16 bits | Time for a quiet period. Time taken for a next scheduled quiet period. This plays a role in synchronizing quiet periods of overlapped BSs. This TTQP is divided into two subfields, time scale and time. Time scale subfield specifies a scale of time subfield as it is. Time subfield includes 15-bit unsigned integer number. |
| DQP | 16 bits | Sustain time of quiet period Estimated sustain period of a next scheduled quiet period. This is specified in a manner similar to that of TTQP field. |
| PP | 1 bit | Presence of Preamble Indicating whether a preamble of a next frame exists. For example, if a cell operates on a single physical channel (i.e., TV), frame preamble is unnecessary. |
| Tx ID | 48 bits | Address uniquely indicating a transmitter (CPE or BS) of SCH |
| CN | 8 bits | Channel number Indicating a start physical channel (i.e., TV) used by BS |
| NC | 2 bits | Channel number If channel combination is performed, this field indicates a number of additionally consecutive physical channels (i.e., TV) used by BS. In case of basic mode, NC = 2 (i.e., two additional TV channels). This is interpreted as total three physical channels are combined. |
| AW Present | 1 bit | Presence of alert window (AW) Deciding whether AW exists as a portion of first frame in superframe structure 0: AW non-presence 1: AW presence |
| BFB | 16 bits | Combined frame bitmap If BS operated in combined mode and if single channel mode CPE needs to be supported, this field indicates which band is combined for each frame of superframe and which band is a single channel. Bit = 0: Corresponding frame is combined. Bit = 1: Corresponding frame is for TV channel. |
| Number of the Narrowbands ! = 0 { for (i=1; i≤n; i++) { | | N means a number of narrowband |
| Frame Numbers | 8 bits | Indicating list of frame number supporting narrowband mode CPE |
| } } | | |
| GIF | 1 bit | Guard interval element Specifying GIF used by physical layer in frame transmission of this superframe: 4 = Default mode used for superframe transmission |
| Length | 8 bits | Length of information following SCH |
| IEs | variable | Selective information elements transmittable with SCH: MAC version, Current transmission power, Part 74 confirmation, Position configuration information |
| HCS | 8 bits | Header search sequence |
| } | | |

Referring to Table 6 and Table 7, in case of table 6 showing that SCH is common to every channel, 8-bit information is allocated to both 'Narrowband number' and 'Frame Numbers' in a portion indicating a narrowband mode support unit resource area to provide a list of channel and frames supporting a narrowband mode.

On the contrary, in case of Table 7 showing different SCH per channel, 8-bit information is allocated to 'Frame Numbers' only in a portion indicating a narrowband mode support unit resource area to provide a list of frames supporting a narrowband mode only.

Meanwhile, after the channel number and the frame number available for the narrowband mode have been designated to the SCH, a period or frame number from a channel or frame supporting an initial narrowband mode to a channel number and frame for a next narrowband mode, as shown in Table 8, is notified in each frame.

TABLE 8

| Syntax | size | Notes |
| --- | --- | --- |
| DS_Extended_IE( ) { | | |
| Extended DIUC | 4 bits | 0x00 |
| Length | 4 bits | |
| Channel Number | 8 bits | Indicating a next narrowband channel number used by BS |
| Frame Number | 8 bits | Indicating a next narrowband frame number used by BS |
| Duration from the previous Narrowband Frame | 16 bits | Sustain period from the previous narrowband frame |
| } | | |

Referring to Table 8, according to the present embodiment, 'Channel Number' indicates a number of next narrowband channel used by a BS using 8-bit information, 'Frame Number' indicates a number of next narrowband frame used by a BS using 8-bit information, and 'Duration from the previous Narrowband Frame' indicates a sustain period from a previous narrowband frame using 16-bit information.

Compared to Table 5 for the embodiment relating to the superframe structure for setting at least one frame region to support the narrowband mode, Table 8 differs from Table 5 in that a number of a next narrowband mode support channel is informed as well as a frame number of a next narrowband mode support frame is delivered. This is because a resource area supporting a narrowband mode in a superframe structure according to the present embodiment is changed in a channel region as well as in a frame region.

A method of performing communication between a base station and a terminal using the superframe having the above-explained structure is explained as follows.

In a communication method according to one embodiment of the present invention, as mentioned in the foregoing description, in performing communication using a superframe including a resource area supporting a narrowband mode distributed in a prescribed frame and a prescribed channel region, a base station inserts position information in a FCH and/or DL-MAP information part of a frame of a unit resource area of a corresponding resource area to inform a terminal of a corresponding resource region.

And, the terminal is also able to obtain such a channel position through FCH and/or DLP-MAP as well as SCH of the superframe. Through this, a narrowband mode terminal entering a network in the middle of the superframe can be provided with a seamless communication service.

Meanwhile, the base station is able to additionally insert position information of a narrowband mode support channel in the SCH as well as the aforesaid header part of the unit resource area. In this case, position information of a frame initially supporting a narrowband mode can be preferably delivered to the narrowband mode terminal through the SCH.

In the superframe structures according to the aforesaid three kinds of embodiments, information included in SCH and a frame can be discriminated as follows.

TABLE 9

| Preamble | |
| --- | --- |
| SCH (superframe control header) | System type |
| | Channel information |
| | channel number |
| | type (narrowband/broadband) |
| | channel number |
| | Frame number and size |
| | Quiet period schedule (start time, sustain time) |
| Frame | Preamble |
| | FCH (Frame Control Header): |
| | DL and US-MAP sizes |
| | Channel descriptor |
| | PHY characteristic |
| | Channel information (current channel (frame) type & time to next narrowband channel (frame)) -> may be included in DL-MAP |
| | DL/UL-MAP |
| | Burst |
| | UCS (urgent coexistence situation): incumbent detection report |
| | Bandwidth request |
| | SSS (sliding self-coexistence slots) |

Items normally indicated in Table 9 are limited to the case that channel information for supporting a service of terminal having different performance is included in both SCH and a frame and included in FCH or DL-MAP information in the frame.

A base station is able to perform communication using the superframe having the above-explained structure even if a narrowband mode terminal enters a network in the course of a superframe period.

Configurational features of a base station and a terminal which perform data communication using the superframe are explained with reference to the drawings as follows.

An example of configurational features of a base station capable of performing seamless communication with a narrowband mode terminal according to one embodiment of the present invention will be explained.

A base station according to one embodiment of the present invention performs communication using a superframe including at least one resource area supporting narrowband mode communication, and more particularly, at least one channel region, at least one frame region, or a region distributed and located in a prescribed channel region and a prescribed frame region. And, the base station can include an information inserting unit and a transmitting & receiving unit. The transmitting & receiving unit can include a data receiving unit and a data transmitting unit in accordance with functions.

First of all, the information inserting unit of the base station inserts information indicating a position of a resource area capable of supporting a narrowband mode terminal in a header part of a unit resource area of a corresponding superframe, and more particularly, in an FCH and/or MAP information part of a frame.

In this case, the inserted information may differ in accordance with a type of a resource area supporting a narrowband mode.

In particular, in case that the resource area includes at least one channel region, the inserted information may be the information indicating a channel number of the channel region.

In case that the resource area includes at least one frame region, the inserted information may be the information indicating whether the frame region including the unit resource area itself supports the narrowband mode or the information indicating a number of a frame region including a narrowband mode support unit resource area next to a corresponding unit resource area and a sustain time to the corresponding area.

In case that a resource area supporting a narrowband mode is distributed and located in a prescribed channel region and a prescribed frame region, the inserted information may be the information indicating whether the unit resource area itself supports the narrowband mode terminal or the information on a fame number of a unit resource area supporting a narrowband mode next to the former unit resource area, a channel number, and a sustain period to the corresponding area.

After the information on the resource area supporting the narrowband mode has been inserted in the corresponding superframe by the information inserting unit, data is transmitted to a narrowband terminal entering a network within the superframe period by the data transmitting unit of the transmitting & receiving unit or data is received by the data receiving unit.

An example of configurational features of a terminal capable of performing seamless communication with a base station according to one embodiment of the present invention will be explained.

Like the base station, a terminal according to one embodiment of the present invention performs communication using a superframe including at least one resource area supporting narrowband mode communication, and more particularly, at least one channel region, at least one frame region, or a region distributed and located in a prescribed channel region and a prescribed frame region.

The terminal may include a location information obtaining unit and a transmitting & receiving unit. The transmitting & receiving unit can include a data transmitting and a data receiving unit in accordance with functions.

First of all, a terminal, and more particularly, a narrowband mode terminal should obtain a position of a resource area supporting a narrowband mode to perform communication with a base station.

So, the location information obtaining unit of the terminal according to one embodiment of the present invention searches a header part of a unit resource area and then obtains location information of a resource area supporting narrowband mode communication.

In this case, the header part of the unit resource area, as mentioned in the foregoing description, may include FCH and/or DL MAP. And, the obtained location information can indicate whether the unit resource area itself including the location information supports the narrowband mode or include location information on a next narrowband mode support unit resource area.

In any case, the narrowband mode terminal should deliver the location information of the resource area to enable the narrowband mode terminal to initiate communication with the base station within the corresponding superframe period.

After the location information of the resource area supporting the narrowband mode has been obtained, the transmitting & receiving unit of the terminal according to one embodiment of the present invention is able to perform communication with the base station in a manner of receiving data via the data receiving unit or transmitting data via the data transmitting unit.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

Accordingly, a frequency policy information broadcasting method, a cognitive radio communication method using the same, and an enhanced superframe structure according to the present invention are applicable to various communication systems including IEEE 802.22 associated communication system performing standardization on cognitive ratio communication and the like.

What is claimed is:

1. A method for broadcasting frequency policy information for cognitive radio communication by a policy broadcaster apparatus, the method comprising:
   generating a policy broadcasting packet including frequency policy information for each region for a cognitive radio communication, wherein the frequency policy information for each region is used based on a location of a terminal, and wherein the policy broadcasting packet further includes at least one of a preamble for matching synchronization with the policy broadcasting packet, a header of the frequency policy information, and power regulation situation information for each region or each service; and
   broadcasting the generated policy broadcasting packet to terminals of the each region including the terminal for the cognitive radio communication,
   wherein the policy broadcasting packet further includes a frequency allocation for the each region, a type of service provided on the allocated frequency, and a parameter indicating how to perform sensing by measuring specific features according to the type of service, for the terminals of the each region, and
   wherein the parameter includes information on a type of a sequence used in case of CDMA (Code Division Multiple Access), information on a bandwidth and a preamble in case of OFDM (Orthogonal Frequency Division Multiplexing), information on shift keying, and information on a cyclostationary characteristic.

2. The method of claim 1, wherein the policy broadcasting packet is transmitted in a manner of broadcasting information for a specific service.

3. The method of claim 1, wherein the frequency policy information includes information for sensing an available frequency band in accordance with each type of the service.

4. The method of claim 1, wherein a header of the frequency policy information includes at least one of information for checking whether the frequency policy information is latest information, information on a position to which the frequency policy information is applied, and length information of the frequency policy information.

5. The method of claim 1, wherein in broadcasting the policy broadcasting packet, the frequency policy information is configured in a form of bit arrangement.

6. The method of claim 1, further comprising:
   defining a profile for the frequency policy information set for each region; and
   selecting the frequency policy information corresponding to a terminal based on a location of the terminal, within the profile.

7. A policy broadcaster apparatus configured to broadcast frequency policy information for cognitive radio (CR) communication, the apparatus comprising:

a packet generating unit configured to generate a policy broadcasting packet including frequency policy information for each region for a cognitive radio communication, wherein the frequency policy information for each region is used based on a location of a terminal, and wherein the policy broadcasting packet further includes at least one of a preamble for matching synchronization with the policy broadcasting packet, a header of the frequency policy information, and power regulation situation information for each region or each service; and a broadcasting unit configured to broadcast the policy broadcasting packet to terminals of the each region including the terminal for the cognitive radio communication, generated by the packet generating unit, wherein the apparatus is provided to perform the broadcasting of the frequency policy information for the cognitive radio communication, wherein the policy broadcasting packet further includes a frequency allocation for the each region, a type of service provided on the allocated frequency, and a parameter indicating how to perform sensing by measuring specific features according to the type of service, for the terminals of the each region, and wherein the parameter includes information on a type of a sequence used in case of CDMA (Code Division Multiple Access), information on a bandwidth and a preamble in case of OFDM (Orthogonal Frequency Division Multiplexing), information on shift keying, and information on a cyclostationary characteristic.

8. A method for performing communication by a terminal based on cognitive radio (CR) communication, the method comprising:

receiving a policy broadcasting packet including frequency policy information for each region for a cognitive radio communication from a policy broadcaster apparatus provided to perform a broadcast of the frequency policy information for the cognitive radio communication, wherein the policy broadcasting packet further includes at least one of a preamble for matching synchronization with the policy broadcasting packet, a header of the frequency policy information, and power regulation situation information for each region or each service;

obtaining current location information of the terminal from the received frequency policy information;

sensing an available frequency band in accordance with a frequency policy corresponding to the obtained current location information from the received frequency policy information; and initiating the communication via the available frequency band, when the available frequency band is sensed, wherein the policy broadcasting packet further includes a frequency allocation for the each region, a type of service provided on the allocated frequency, and a parameter indicating how to perform sensing by measuring specific features according to the type of service, for the terminals of the each region, and wherein the parameter includes information on a type of a sequence used in case of CDMA (Code Division Multiple Access), information on a bandwidth and a preamble in case of OFDM (Orthogonal Frequency Division Multiplexing), information on shift keying, and information on a cyclostationary characteristic.

9. The method of claim 8, wherein the frequency policy information includes information for sensing an available frequency band in accordance with each type of the service.

10. The method of claim 9, wherein sensing the available frequency band includes:

selecting a prescribed service from the services on an allocated frequency band allocated to the region corresponding to the location information; and sensing whether the selected service currently exists and whether the frequency band used by the selected service is used by a user of the selected service.

11. The method of claim 8, wherein obtaining the current location information includes:

confirming the location of the terminal via GPS or Galileo satellite.

12. The method of claim 8, wherein the frequency policy information obtained prior to initiating the communication is first frequency policy information for each region, and wherein after initiating the communication, the method further comprises:

receiving another policy broadcasting packet including second frequency policy information for each region, and updating the first frequency policy information into the second frequency policy information, if the received second frequency policy information differs from the first frequency policy information.

13. The method of claim 8, wherein the communication after initiating the communication is performed based on the cognitive radio communication, and wherein the cognitive radio communication is performed using a superframe including at least one resource area supporting narrowband mode communication, and the superframe has a structure configured in a manner that information indicating a position of a resource area supporting narrowband mode communication is included in a header part of a unit resource area.

14. A cognitive radio communication based terminal, the terminal performs communication based on cognitive radio (CR) communication, the terminal comprising:

a packet receiving unit configured to receive a policy broadcasting packet including frequency policy information for each region for cognitive radio communication from a policy broadcaster apparatus performing a broadcast of the frequency policy information for the cognitive radio communication, wherein the policy broadcasting packet further includes at least one of a preamble for matching synchronization with the policy broadcasting packet, a header of the frequency policy information, and power regulation situation information for each region or each service;

a location information obtaining unit configured to obtain current location information of the terminal from the received frequency policy information;

a receiving unit configured to sense an available frequency band in accordance with a frequency policy corresponding to the obtained current location information from the received frequency policy information; and a transmitting unit configured to initialize the communication via the available frequency band, when the available frequency band is sensed, thereby performing communication based on the cognitive radio communication, wherein the policy broadcasting packet further includes a frequency allocation for the each region, a type of service provided on the allocated frequency, and a parameter indicating how to perform sensing by measuring specific features according to the type of service, for the terminals of the each region, and wherein the parameter includes information on a type of a sequence used in case of CDMA (Code Division Multiple Access), information on a bandwidth and a preamble in case of OFDM (Orthogonal Frequency Division Multiplexing), information on shift keying, and information on a cyclostationary characteristic.

* * * * *